(12) United States Patent
Xue et al.

(10) Patent No.: US 12,144,012 B2
(45) Date of Patent: Nov. 12, 2024

(54) HISTORICAL PATHLOSS ASSISTED SENSING IN SIDELINK

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 17/592,358

(22) Filed: Feb. 3, 2022

(65) Prior Publication Data

US 2023/0276481 A1    Aug. 31, 2023

(51) Int. Cl.
  *H04W 72/542* (2023.01)
  *H04B 7/0408* (2017.01)
  *H04W 72/02* (2009.01)
  *H04W 72/20* (2023.01)
  *H04W 92/18* (2009.01)

(52) U.S. Cl.
  CPC ........ *H04W 72/542* (2023.01); *H04B 7/0408* (2013.01); *H04W 72/02* (2013.01); *H04W 72/20* (2023.01); *H04W 92/18* (2013.01)

(58) Field of Classification Search
  CPC ... H04W 72/40; H04W 72/02; H04W 72/563; H04W 17/328; H04W 72/085; H04W 72/25; H04W 72/569
  See application file for complete search history.

(56) References Cited

U.S. PATENT DOCUMENTS

| | | |
|---|---|---|
| 2021/0337519 A1 | 10/2021 | Farag et al. |
| 2022/0217655 A1* | 7/2022 | Lee ............ H04W 52/325 |
| 2023/0064680 A1* | 3/2023 | Huang .......... H04L 1/1848 |
| 2023/0199722 A1* | 6/2023 | Hwang ......... H04W 72/02 |
| | | 370/329 |

FOREIGN PATENT DOCUMENTS

| | | |
|---|---|---|
| KR | 20200144472 A | 12/2020 |
| WO | WO-2021047285 A1 | 3/2021 |

OTHER PUBLICATIONS

International Search Report and Written Opinion—PCT/US2023/061864—ISA/EPO—Apr. 28, 2023.

* cited by examiner

*Primary Examiner* — Iqbal Zaidi
(74) *Attorney, Agent, or Firm* — Holland & Hart LLP

(57) ABSTRACT

Methods, systems, and devices for wireless communications are described. Aspects of the present disclosure provide for a user equipment (UE) performing contention-based access to utilize historical pathloss measurements to identify available resources for beamformed sidelink communications. The historical pathloss measurements may be obtained by the UE, by one or more other UEs, or both, where the UE may combine its own historical pathloss measurements with historical pathloss measurements obtained at the one or more other UEs. Such historical pathloss measurements may allow the UE to determine if one or more beam combinations associated with the resources may cause unacceptable interference (e.g., interference satisfying a threshold) while reducing signaling overhead associated with exchanges of inter-UE coordination messages. Accordingly, the UE may determine to yield transmissions over one or more resources or to yield reception to allow other UEs to utilize the one or more resources.

28 Claims, 12 Drawing Sheets

HISTORICAL PATHLOSS ASSISTED SENSING IN SIDELINK

FIELD OF TECHNOLOGY

The following relates to wireless communications, including historical pathloss assisted sensing in sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications, sidelink communications may be supported for one or more operations (e.g., in vehicle-to-everything (V2X) systems). In some cases, the sidelink resources may correspond to resources over 60 GHz (e.g., frequency range 2× (FR2×)) with which the UEs may perform beamformed sidelink communications based on contention-based access procedures (e.g., Mode 2).

SUMMARY

The described techniques relate to improved methods, systems, devices, and apparatuses that support historical pathloss assisted sensing in sidelink. Generally, the described techniques provide for a user equipment (UE) performing contention-based access to utilize historical pathloss measurements (e.g., jamming graph, radio frequency distances) to identify available resources for beamformed sidelink communications. For example, during a sensing window, a first UE may monitor sidelink control information (SCI) transmissions by a second UE to determine that a first set of resources in a resource selection window are associated with a first sidelink transmission by the second UE. In accordance with this determination, the first UE may use historical pathloss measurements to identify whether overlapping sidelink resources can be safely used to transmit its own second sidelink transmission.

A method for wireless communications at a first UE is described. The method may include receiving, during a sensing window, an indication of a first set of resources in a resource selection window that are associated with a first sidelink transmission by a second UE, selecting a second set of resources in the resource selection window for a second sidelink transmission, where a degree of overlap between the second set of resources and the first set of resources is based on one or more historical pathloss measurements between the first UE and the second UE, and communicating with a third UE via the second sidelink transmission using the second set of resources.

An apparatus for wireless communications at a first UE is described. The apparatus may include a processor, memory coupled with the processor, and instructions stored in the memory. The instructions may be executable by the processor to cause the apparatus to receive, during a sensing window, an indication of a first set of resources in a resource selection window that are associated with a first sidelink transmission by a second UE, select a second set of resources in the resource selection window for a second sidelink transmission, where a degree of overlap between the second set of resources and the first set of resources is based on one or more historical pathloss measurements between the first UE and the second UE, and communicate with a third UE via the second sidelink transmission using the second set of resources.

Another apparatus for wireless communications at a first UE is described. The apparatus may include means for receiving, during a sensing window, an indication of a first set of resources in a resource selection window that are associated with a first sidelink transmission by a second UE, means for selecting a second set of resources in the resource selection window for a second sidelink transmission, where a degree of overlap between the second set of resources and the first set of resources is based on one or more historical pathloss measurements between the first UE and the second UE, and means for communicating with a third UE via the second sidelink transmission using the second set of resources.

A non-transitory computer-readable medium storing code for wireless communications at a first UE is described. The code may include instructions executable by a processor to receive, during a sensing window, an indication of a first set of resources in a resource selection window that are associated with a first sidelink transmission by a second UE, select a second set of resources in the resource selection window for a second sidelink transmission, where a degree of overlap between the second set of resources and the first set of resources is based on one or more historical pathloss measurements between the first UE and the second UE, and communicate with a third UE via the second sidelink transmission using the second set of resources.

Some examples of the method, apparatuses, and non-transitory computer-readable medium described herein may further include operations, features, means, or instructions for monitoring a wireless communications channel to obtain at least a portion of the historical pathloss measurements, where the monitoring may be based on the indication of the first set of resources.

Some examples of the method, apparatuses, and non-transitory computer-readable medium described herein may further include operations, features, means, or instructions for receiving an indication of at least a portion of the historical pathloss measurements from the second UE.

In some examples of the method, apparatuses, and non-transitory computer-readable medium described herein, the indication of at least a portion of the historical pathloss measurements from the second UE corresponds to a unicast message, a PC5-radio resource control message, a medium access control-control message, or some combination thereof.

In some examples of the method, apparatuses, and non-transitory computer-readable medium described herein, at least a portion of the historical pathloss measurements occur outside of the sensing window.

In some examples of the method, apparatuses, and non-transitory computer-readable medium described herein, communicating with the third UE may include operations, features, means, or instructions for yielding, at the first UE, sidelink resources based on the one or more historical pathloss measurements, the indication of the first set of resources, the second set of resources, and a threshold, the threshold associated with the one or more historical pathloss measurements.

Some examples of the method, apparatuses, and non-transitory computer-readable medium described herein may further include operations, features, means, or instructions for selecting the second set of resources in the resource selection window for the second sidelink transmission to be non-overlapping with the first set of resources when one or more pathloss measurements between the first UE and the second UE in the historical pathloss measurements satisfy the threshold.

Some examples of the method, apparatuses, and non-transitory computer-readable medium described herein may further include operations, features, means, or instructions for selecting the second set of resources in the resource selection window for the second sidelink transmission to be partially overlapping with the first set of resources when one or more pathloss measurements between the first UE and the second UE in the historical pathloss measurements being less than the threshold.

In some examples of the method, apparatuses, and non-transitory computer-readable medium described herein, the one or more historical pathloss measurements include beam specific measurements, the beam specific measurements based on beam pairs associated with the first set of resources and selecting the second set of resources in the resource selection window for the second sidelink transmission may be based on the beam specific measurements.

In some examples of the method, apparatuses, and non-transitory computer-readable medium described herein, the indication of the first set of resources includes sidelink control information.

In some examples of the method, apparatuses, and non-transitory computer-readable medium described herein, the sidelink control information includes transmission beam indices associated with sidelink transmissions corresponding to the first UE, the second UE, or both, the historical pathloss measurements based on the transmission beam indices.

In some examples of the method, apparatuses, and non-transitory computer-readable medium described herein, the sidelink control information further includes one or more reservation fields, the reservation fields corresponding to a set of transmission beam indices and reception beam indices, the historical pathloss measurements based on the set of transmission beam indices and reception beam indices.

Some examples of the method, apparatuses, and non-transitory computer-readable medium described herein may further include operations, features, means, or instructions for updating the one or more historical pathloss measurements according to a periodic schedule, one or more update triggers, an aperiodic schedule, or some combination thereof.

In some examples of the method, apparatuses, and non-transitory computer-readable medium described herein, the selection of the second set of resources may be based on a contention-based access procedure, the one or more historical pathloss measurements, or both.

In some examples of the method, apparatuses, and non-transitory computer-readable medium described herein, the first UE selects or discards a subset of measurements of the one or more historic pathloss measurements to use in selecting the second set of resources, the subset of measurements based on temporal proximities associated with the one or more historic pathloss measurements, a set of default historical pathloss measurements, or both.

DETAILED DESCRIPTION

Figure 1:
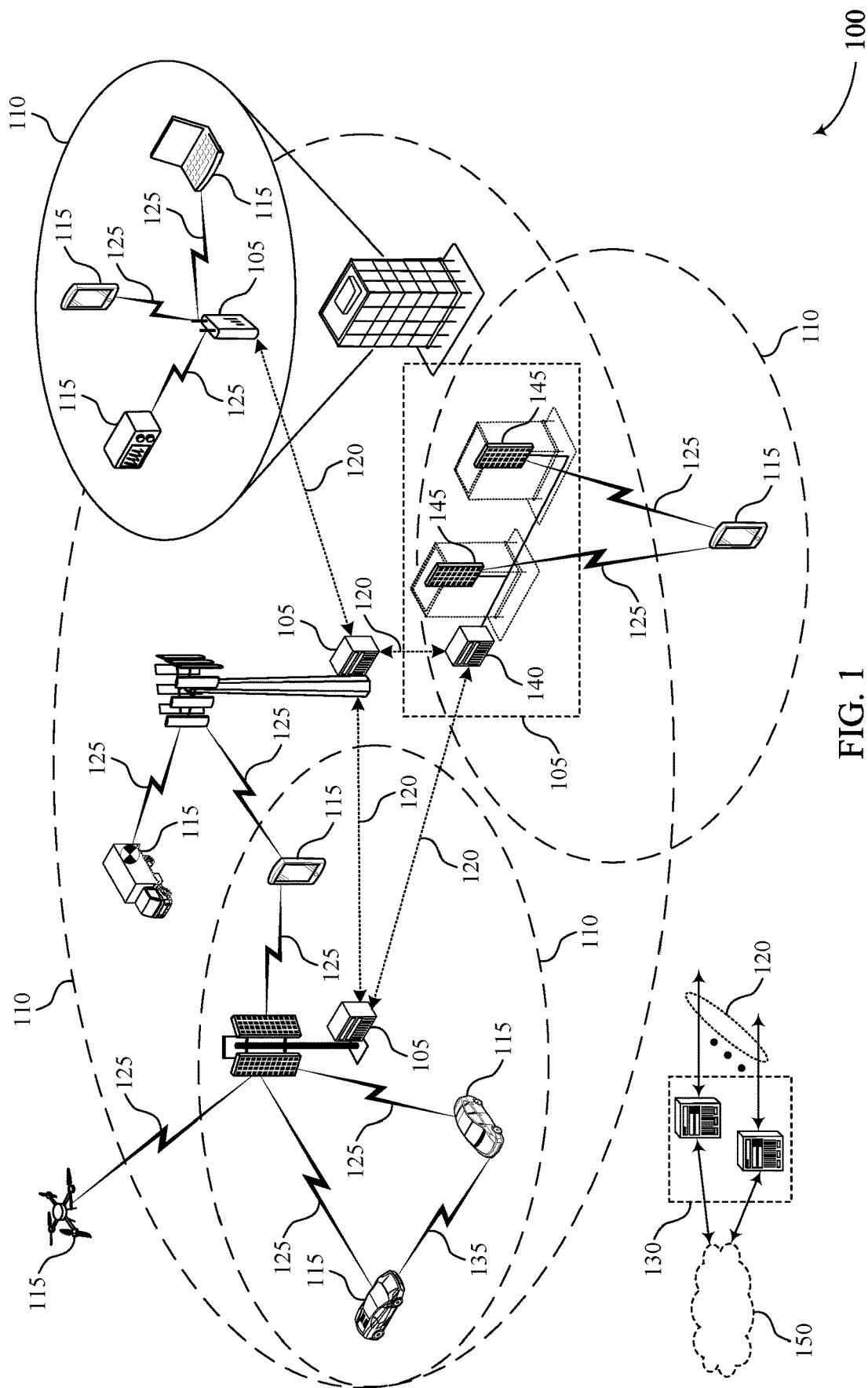
FIG. 1 illustrates an example of a wireless communications system that supports historical pathloss assisted sensing in sidelink in accordance with aspects of the present disclosure.

In 5G new radio (NR), two user equipments (UEs) may exchange messages via a sidelink connection. For example, in vehicle-to-everything (V2X) systems, a UE may exchange safety messages with nearby UEs (e.g., vehicles) over sub-6 GHz licensed bands, intelligent transport systems (ITS), or both. Such UEs may exchange safety messages via resources assigned by a base station (e.g., Mode 1), resources obtained through contention-based access procedures (e.g., Mode 2), or both. For example, one or more UEs may utilize Mode 2 resource allocation for autonomous deployment (e.g., for deployment out of cell coverage).

A first UE operating in Mode 2 may monitor a sensing window prior to a resource scheduling window to determine which resources within the resource scheduling window are available for a sidelink transmission by the first UE. For example, the UE may monitor the sensing window for sidelink control information (SCI) transmissions by a second UE to identify which sidelink resources within the resource scheduling window have been reserved for sidelink transmissions by the second UE. In some cases, the first UE may exchange inter-UE coordination messages with one or more helper UEs during the sensing window. These inter-UE coordination messages may inform the first UE of resources within the resource scheduling window that are recommended for sidelink transmissions by the first UE according to the local sensing performed by the helper UE(s). These inter-UE coordination messages, however, can be a large overhead burden because they are exchanged frequently during the sensing window and may involve setting or aligning beamforming for each message exchanged.

To address this issue, as a possible alternative or addition to the use of inter-UE coordination messages, aspects of the present disclosure provide for a first UE performing Mode 2 sidelink operations to utilize historical pathloss measurements (e.g., jamming graph, radio frequency (RF) distances) to identify available resources for beamformed sidelink communications. For example, if the first UE detects during a sensing window that a second UE has reserved resources during a resource selection window, the first UE may use historical pathloss measurements between the first UE and the second UE to determine whether a second sidelink transmission by the first UE can safely occupy the same resources by leveraging spatial reuse.

In some cases, the historical pathloss measurements may be obtained by the first UE, by one or more other UEs, such as helper UEs or the second UE, or both. For example, the first UE may combine its own historical pathloss measurements with historical pathloss measurements obtained at the one or more other UEs. Using the historical pathloss measurements, the first UE may determine if the use of one or more beam combinations to transmit the second sidelink transmission would cause an unacceptable amount of interference (e.g., greater than a threshold amount of interference) for the first sidelink transmission by the second UE over the identified resources. Accordingly, the UE may determine to yield transmissions over resources that overlap with the first sidelink transmission by the second UE or to yield reception over resources that overlap with the first sidelink transmission by the second UE to avoid unmanageable amounts of interference. Such techniques may provide for more flexible beam utilization, decreased occurrences of interference between devices utilizing shared sidelink resources, and decreased signaling overhead.

Aspects of the disclosure are initially described in the context of wireless communications systems. Aspects of the disclosure are further illustrated by and described with reference to a wireless communications system, historical pathloss measurements resource diagrams, a subset, and a process flow. Aspects of the disclosure are further illustrated by and described with reference to apparatus diagrams, system diagrams, and flowcharts that relate to historical pathloss assisted sensing in sidelink.

FIG. 1 illustrates an example of a wireless communications system 100 that supports historical pathloss assisted sensing in sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (Hf) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Aspects of the present disclosure provide for a first UE performing contention-based access to utilize historical pathloss measurements (e.g., jamming graph, RF distances) to identify available resources for beamformed sidelink communications. For example, during a sensing window, the first UE may obtain historical pathloss measurements to identify whether a sidelink resource can be safely occupied. In some cases, the historical pathloss measurements may be obtained by the first UE, by a second UE, or both, where the first UE may combine its own historical pathloss measurements with historical pathloss measurements obtained at the second UE. Such historical pathloss measurements may allow the first UE to determine if one or more beam combinations associated with the resources may cause unacceptable interference (e.g., interference satisfying a threshold) while reducing signaling overhead associated with exchanges of inter-UE coordination messages. Accordingly, the first UE may determine to yield transmissions over one or more resources or to yield reception to allow the second UE to utilize the one or more resources. Such techniques may provide for more flexible beam utilization, decreased occurrences of interference between devices utilizing shared sidelink resources, and decreased signaling overhead.

Figure 2A:
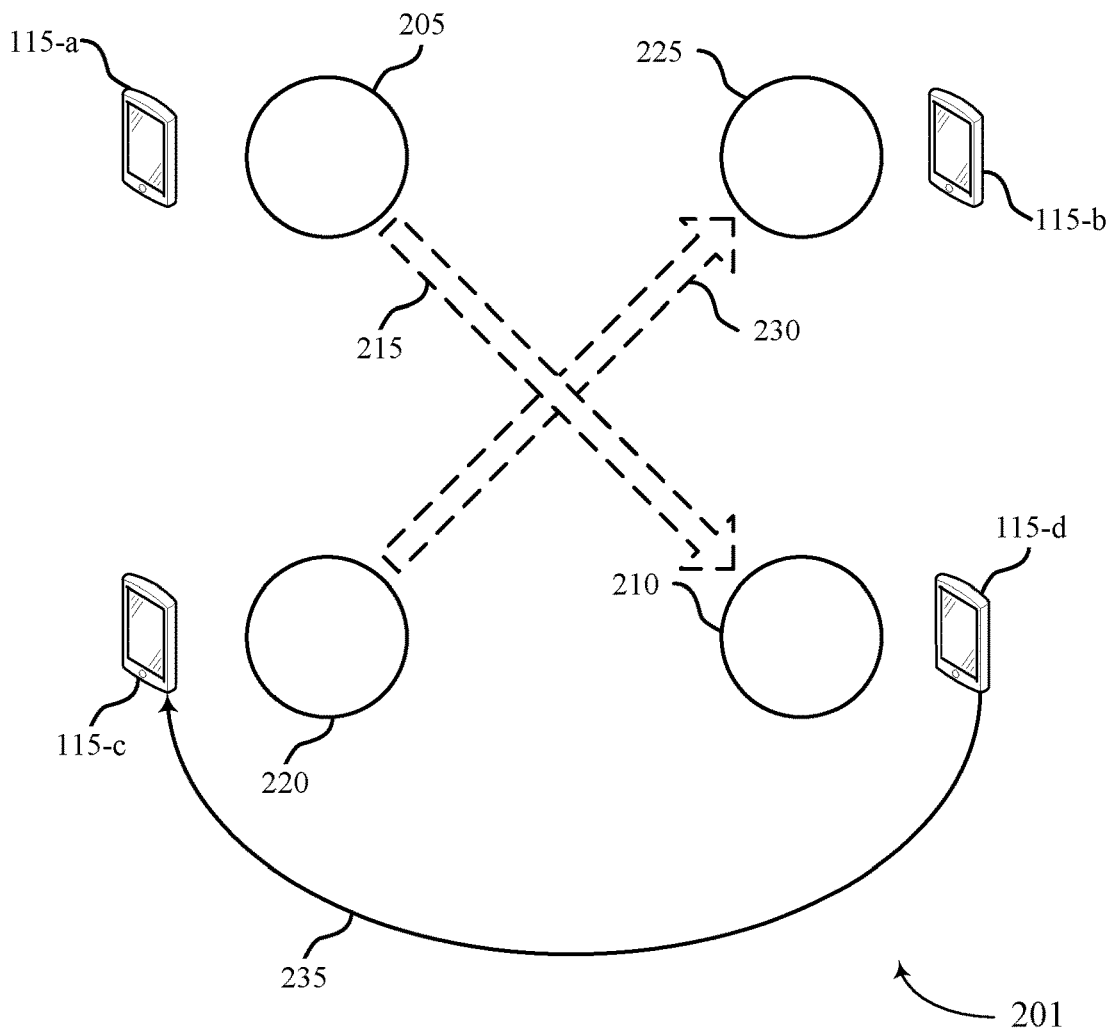
FIGS. 2A and 2B illustrate examples of a wireless communications system and a resource diagram that support historical pathloss assisted sensing in sidelink in accordance with aspects of the present disclosure.

FIG. 2A illustrates an example of a wireless communications system 201 that supports historical pathloss assisted sensing in sidelink in accordance with aspects of the present disclosure. The wireless communications systems may include a UE 115-*a*, a UE 115-*b*, a UE 115-*c*, and a UE 115-*d*, which may be examples of the UE 115 as illustrated in FIG. 1.

The UEs 115-*a*, 115-*b*, 115-*c*, and 115-*d* may perform Mode 2 contention-based access procedures in support of sidelink operations (e.g., leveraging unicast relationships between the UEs 115-*a*, 115-*b*, 115-*c*, and 115-*d*). For example, in accordance with aspects of the present disclosure, the UE 115-*c* may utilize historical pathloss measurements of beamformed communications obtained by the UE 115-*c*, as well as the UEs 115-*b*, 115-*a*, and 115-*d*, which may be at least partially collected outside of an associated SW, to identify available resources within an RSW. That is, the UE 115-*a* may utilize measurements associated with beamformed communications within the wireless communications system 201 to determine if one or more of the beamformed communications may interfere with subsequent sidelink signaling associated with the UE 115-*a*. For example, the UEs 115-*a*, 115-*b*, 115-*c*, and 115-*d* may collect historical pathloss measurements over time to characterize sidelink resource utilization within the wireless communications system 201. Such historical pathloss measurements may be individually collected by the UEs 115-*a*, 115-*b*, 115-*c*, and 115-*d* and subsequently exchanged amongst the UEs 115-*a*, 115-*b*, 115-*c*, and 115-*d*, providing increased situational awareness of resource utilization within the wireless communications system 201.

For example, in support of a scheduled sidelink transmission, the UE 115-*c* may perform sensing for a transmission from beam space 220 to beam space 210 of UE 115-*d*, which may be associated with constructing a self-maintained (e.g., at the UE 115-*c*) historical pathloss measurements indicating RF distances from beam space 220 to beam space 225 of the UE 115-*b*. That is, the UE 115-*c* may perform measurements characterizing possible interference due to transmissions 230 based on a first set of resources. The UE 115-*c* may determine, based on the self-maintained historical pathloss measurements, a second set of resources to utilize for subsequent sidelink communications (e.g., depending on a degree of overlap, predicted interference, or the like) or to yield the scheduled sidelink transmission on a reserved subchannel (e.g., reserved by the UE 115-*b*) to avoid interfering with signals received at the UE 115-*b*. For example, the UE 115-*c* may decode an SCI within a SW from the UE 115-*a*, where the SCI may indicate that the UE 115-*a* reserved a subchannel within an RSW for a transmission from beam space 205 to beam space 225 (e.g., of UE 115-*b*). As such, the UE 115-*c* may determine to yield transmissions (e.g., perform transmission-yielding (TX-yielding)) to allow the UE 115-*b* to receive transmission from the UE 115-*a*.

In other examples, such as if the UE 115-*c* receives historical pathloss measurements from the UE 115-*d* indicating RF distances from beam space 205 of the UE 115-*a* to beam space 210 of the UE 115-*d*, the UE 115-*d* may determine to perform receive-yielding (RX-yielding) on reserved subchannels to avoid dummy transmissions. Put another way, the UE 115-*c* may determine that interference may exist at the UE 115-*d* (e.g., due to transmissions 215), and subsequently determine to perform RX-yielding, since transmissions from the UE 115-*c* to the UE 115-*d* may be distorted/interfered with by the transmissions 215. For example, when the UE 115-*c* is sensing for transmissions to the UE 115-*d*, the UE 115-*c* may receive an indication of historical pathloss measurements obtained at the UE 115-*d*, which may be used to determine RX-yielding (e.g., whether to give up transmissions at the UE 115-*c* due to strong interference from the UE 115-*a* to the UE 115-*d* via transmissions 215).

The historical pathloss measurements obtained at the UE 115-*d* may be transmitted to the UE 115-*c* via a transmission 235. In some cases, such as when there is a unicast connection between the UE 115-*c* and the UE 115-*c*, the UE 115-*c* and UE 115-*d* may negotiate how to exchange historical pathloss measurements via PC5-radio resource control (RRC). For example, the UE 115-*c* and the UE 115-*d* may agree to mutually update historical pathloss measurements periodically, based on events, or in an aperiodic fashion. Additionally or alternatively, the UE 115-*c* and the UE 115-*d* may agree to define an L1 trigger for aperiodic updates to the historical pathloss measurements. Based on the negotiations, the historical pathloss measurements may be exchanged between the UE 115-*c* and the UE 115-*d* via PC5-RRC messages, medium access control-control element (MAC-CE) messages, or both, which may be associated with PC5-RRC measurements facilitating path loss-based open-loop power control. In some cases, historical pathloss measurements from the UE 115-*c*, UE 115-*d*, or both, may be constant (e.g., or almost constant) in stationary deployment and, hence, may be associated with decreased signaling (e.g., fewer PC5-RRC messages, MAC-CE messages, or both).

Figure 2B:
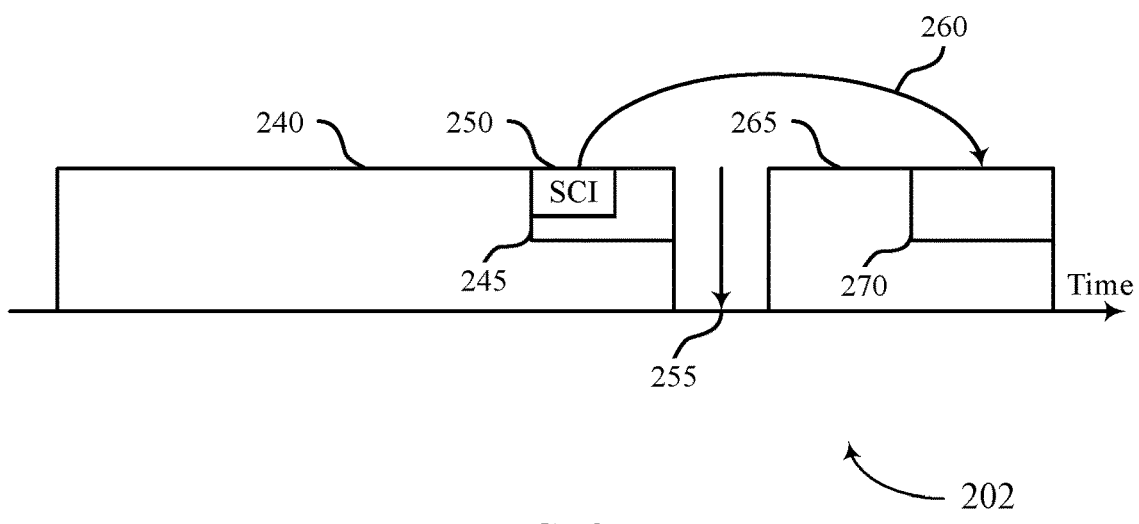

FIG. 2B illustrates an example of a resource diagram 202 supporting the use of historical pathloss measurements in NR sidelink communications. For example, as discussed with reference to FIG. 2A, a first UE may utilize historical pathloss measurements collected via one or more measurements (e.g., possibly outside of a current SW 240), obtained by other UEs, or both, in identifying whether a sidelink resource can be safely utilized. In some examples, the UE may determine whether a sidelink resource can be safely occupied by a PSCCH, PSSCH, or both, when performing sensing within the SW 240.

For example, the UE may examine an SCI 250 within a resource 245 during the SW 240. The SCI 250 may include one or more beams associated with one or more UEs performing sidelink communications. Based on the SCI 250, the UE may determine that the resource 245 (e.g., or some other sidelink resource) is not available for the PSCCH/ PSSCH if RF distances within the historical pathloss measurements predicts unacceptable interference (e.g., if other beams are present at the receiver, if transmissions from the UE may interfere with previously scheduled transmissions of other UEs).

In some cases, the UE may determine to perform TX-yielding of the PSSCH/PSCCH based on intended receiving UEs, a reservation SCI, or both. Alternatively, the UE may determine to perform receive-yielding of the PSSCH/ PSCCH to an intended receiving UE based on a reservation SCI. In some cases, the UE may correspond to Mode 2 (e.g., as discussed with reference to FIG. 2A) performing sensing for transmissions from the UE. In other cases, however, the UE may operate in Mode 1 while performing re-evaluation with respect to a soft-grant received from a base station (e.g., gNodeB (gNB), roadside unit (RSU), etc.). In yet other cases, the UE may operate according to Mode 2 while performing sensing for a UE coordination message.

In any case, according to the historical pathloss measurements, SCIs, or both, the UE may determine that the resource 245 may be available in a subsequent frame. Based on the determination, the UE may, at a resource selection trigger 255, determine to utilize a resource 270 based on the SCI 250 (e.g., which may indicate the resource 270 via a relationship 260, which may correspond to indicated beam indices), historical pathloss measurements, or both. As such, during an RSW 265, the UE may schedule sidelink resources via the resource 270.

Figure 3:
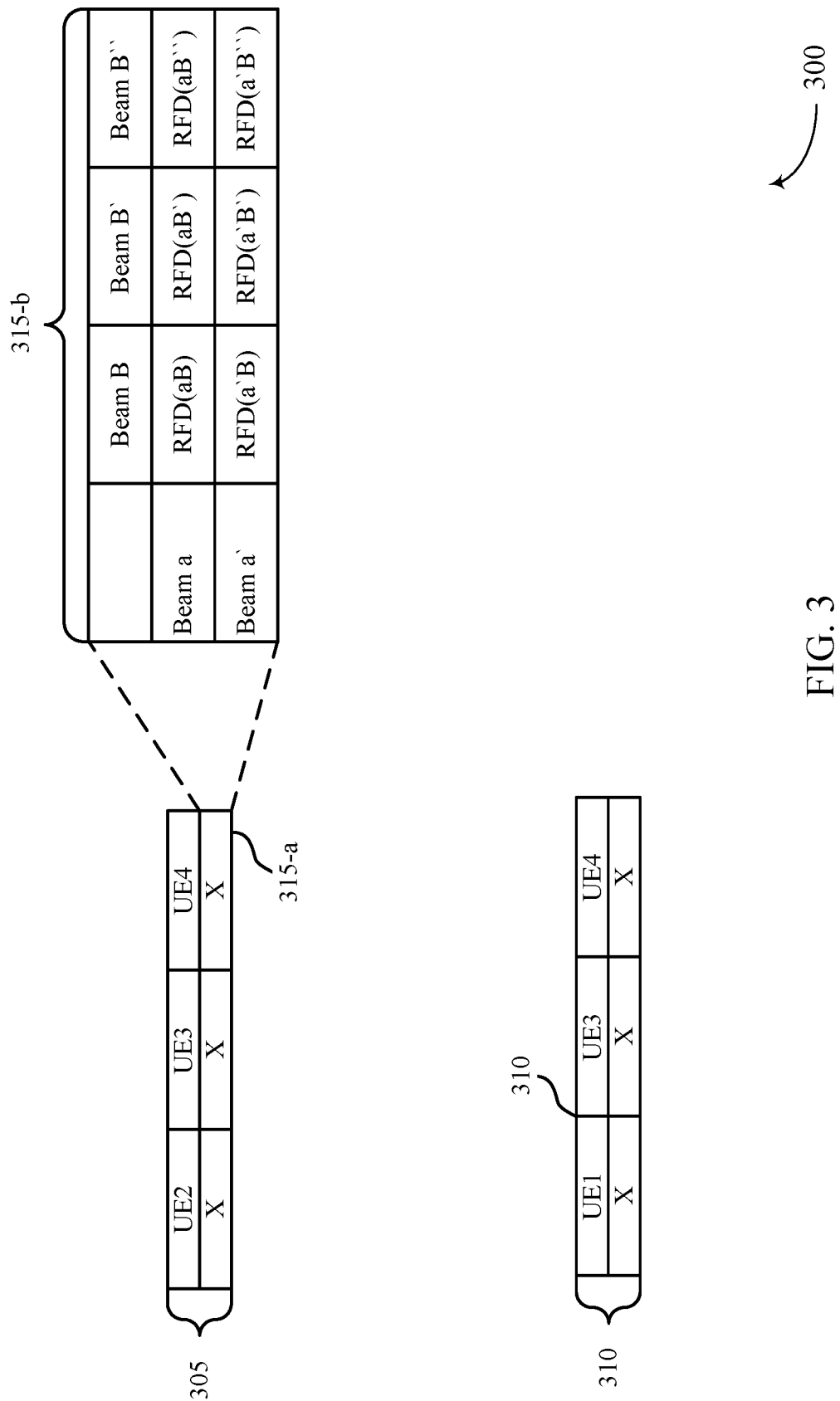
FIG. 3 illustrates an example of historical pathloss measurements that supports historical pathloss assisted sensing in sidelink in accordance with aspects of the present disclosure.

FIG. 3 illustrates an example of historical pathloss measurements 300 that supports historical pathloss assisted sensing in sidelink in accordance with aspects of the present disclosure. The historical pathloss measurements 300 may be implemented by one or more UEs 115

In some examples, the UEs may obtain historical pathloss measurements relative to other UEs (e.g., in one or more geographic regions, under control of a common base station, or the like). The historical pathloss measurements may include beam specific entries carrying RF distances corresponding to respective beam pairs associated with beamformed sidelink communications between a first UE 115 and other UEs (e.g., a second UE 115). For example, table 305 may be associated with historical pathloss measurements at the first UE 115 relative to the second UE 115. As another example, table 310 may correspond to historical pathloss measurements at UE2 (e.g., where UE1 may correspond to the first UE 115 and where UE2 may correspond to the second UE 115).

As illustrated in FIG. 3, the first UE 115 may detect three other UEs 115 (e.g., the second UE 115, a third UE 115, and a fourth UE 115). For example, the first UE 115 may overhear SCI transmissions from the three other UEs 115. The SCIs may include transmission beam indices (e.g., beam a, beam a', beam B, beam B', beam B") such that the first UE 115 may perform beam space measurements for generating the table 305. In some cases, reservation fields within the overheard SCI transmissions may further include transmission beam indices and receiving beam indices. Determining both transmission beam indices and receiving beam indices may allow the first UE 115 to construct beam space subentries between itself and other UEs 115. Such reservation fields may also enable the first UE 115 to reserve resources in different beam spaces from a current or past transmission. In contrast, other techniques, such as legacy sensing, the first UE 115 may predict interference at reserved subchannels based on measurements at a current subchannel. Instead, the historical pathloss measurements allow the first UE 115 to reserve beam spaces different from reserved subchannels and the current subchannel.

For example, the first UE 115 may construct a beam space sub-entry 315-*b* associated with an entry 315-*a* within the table 305. The beam space subentry may include RF distances for each combination of beams indicated by one or more SCIs. For example, RF distance entries may be obtained, by the first UE 115, for combinations of beam a, beam a', beam B, beam B', beam B", with which the first UE 115 may determine what beams (e.g., and therefore reserved sidelink resources) may result in robust signaling and what beams may result in interference.

In determining whether a sidelink resource reserved by another UE's SCI is available with respect to a PSCCH, PSSCH, or both, the first UE 115 may be configured in L3 to operate according to one or more techniques. For example, the first UE 115 may operate according to legacy sensing (e.g., listen-before-talk (LBT)). For example, the first UE 115 may monitor a sensing window prior to a resource scheduling window to determine which resources within the resource scheduling window are available for a sidelink transmission by the first UE 115. For example, the first UE 115 may monitor the sensing window for SCI transmissions by the second UE 115 to identify which sidelink resources within the resource scheduling window have been reserved for sidelink transmissions by the second UE 115. In some cases, the first UE 115 may exchange inter-UE coordination messages with one or more helper UEs 115 during the sensing window. These inter-UE coordination messages may inform the first UE 115 of resources within the resource scheduling window that are recommended for sidelink transmissions by the first UE 115 according to the local sensing performed by the helper UE(s).

In other examples, the first UE 115 may utilize the historical pathloss measurements in table 305, in combination with LBT, to determine if a sidelink resource is available. Notably, when using historical pathloss measurements in combination with legacy sensing, a resource that may have been determined to be available per legacy sensing may be determined to be not available due to TX-yielding, RX-yielding, or both, since the table 305 in combination with legacy sensing may result in more conservative sensing.

In other examples, the first UE 115 may determine to implement TX-yielding on top of legacy sensing, RX-yielding on top of legacy sensing, or both. Conversely, the first UE 115 may determine to implement TX-yielding, RX-yielding, or both, without legacy sensing. The first UE 115 may determine to utilize the historical pathloss measurements to determine what resources are available without performing legacy sensing. For example, a resource can be determined as available even if it is unavailable per legacy sensing, which may correspond to more relaxed sensing (e.g., more options for transmissions).

In some cases, the first UE 115 may be further configured to dynamically determine what technique of the one or more techniques to utilize according to characteristics of a pending PSSCH/PSCCH transmission at the first UE 115, PSSCH/PSCCH associated with other UEs 115 (e.g., determined from SCIs received within an SW), an RX beam width used in performing SCI detection in the SW, or some combination thereof. For example, the first UE 115 may be configured to utilize a relatively relaxed option, such as determining available sidelink resources based on historical pathloss measurements without legacy sensing, performing TX-yielding without legacy sensing, performing RX-yielding without legacy sensing, or some combination thereof, which may provide more available resources and, therefore, more opportunities to transmit PSSCH, PSCCH, or some other communication, over sidelink resources. In some cases, relatively relaxed options may be associated with using a wide receive beam at the first UE 115 in searching for SCIs from other UEs within the SW.

In some cases (e.g., such as when using a wide RX beam to search for SCIs, when performing legacy sensing, etc.), relevant characteristics of detected sidelink signaling (e.g., associated with PSSCH, PSCCH, SCI reservation) may include associated priorities, transmission power, transmission beam width, reception beam width, beam space duty cycle, and the like, may be determined. Such characteristics may be used (e.g., by the first UE 115) to determine whether to utilize historical pathloss measurements for future sidelink communications, to perform legacy sensing for future sidelink communications, or both.

For example, the first UE 115 may determine to utilize both historical pathloss measurements and legacy sensing if either a considered PSSCH, PSCCH, (e.g., indicated via SCI) a reservation SCI, or some combination thereof, is associated with a high priority. Another example may correspond to the first UE 115 determining that the considered PSSCH, PSCCH, reservation SCI, or some combination thereof is going to be transmitted with boosted power (e.g., from a different UE within a geographic region common with the first UE 115). In further examples, the first UE 115 may determine that the considered PSSCH, PSCCH, or both, may be transmitted with a wide transmission beam, that a receiving UE may utilize a wide receiving beam, or both. In yet other examples, the first UE 115 may determine that the considered PSSCH, PSCCH, or both, may be transmitted via a beam with a long dwelling duration. As such, the first UE 115 may dynamically determine to utilize historical pathloss measurements, legacy sensing, or both, based on the determinations.

Figure 4:
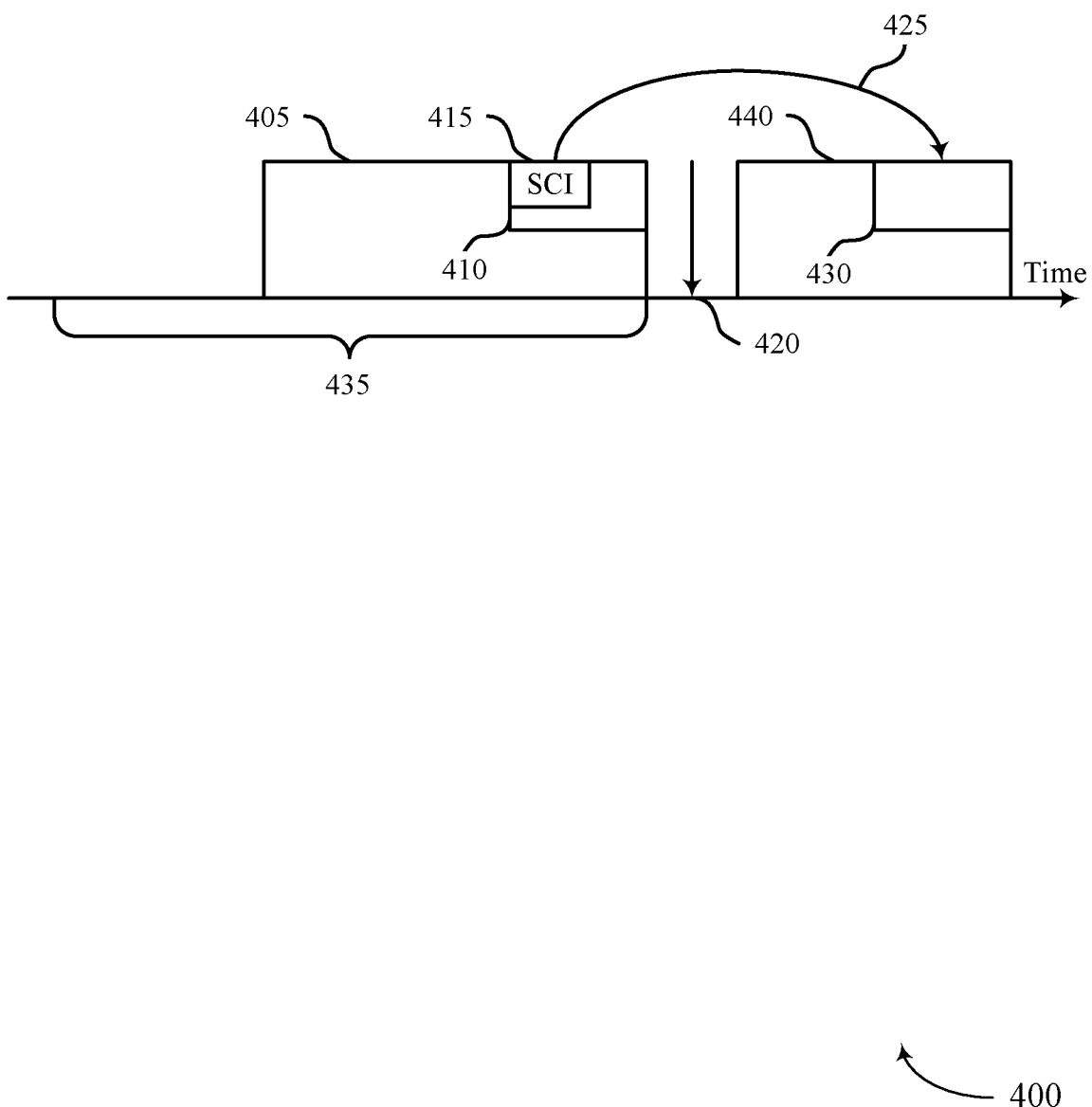
FIG. 4 illustrates an example of a resource diagram that supports historical pathloss assisted sensing in sidelink in accordance with aspects of the present disclosure.

FIG. 4 illustrates an example of a resource diagram 400 that supports historical pathloss assisted sensing in sidelink in accordance with aspects of the present disclosure. The resource diagram may be utilized by one or more UEs under communications in sidelink, which may correspond to the UEs 115 as described in FIGS. 1-3.

FIG. 4 illustrates a SW 405, where a resource 410 may include an SCI 415 associated with one or more UEs. As discussed with reference to FIGS. 2A and 2B, a first UE 115 may obtain information regarding available sidelink resources during the SW 405 and subsequently decide to select one or more resources based on a resource selection trigger 420. For example, the first UE 115 may determine that the SCI 415 indicates a resource 430 (e.g., via a correspondence 425) within an RSW 440.

As discussed with reference to FIGS. 1-3, the first UE 115, operating under Mode 2 sidelink, may utilize the FR2× frequency band to perform measurements to obtain one or more RF distances to assist in determining what resources to select during the RSW 440. Such measurements may be obtained by the first UE 115 itself, one or more other UEs 115 (e.g., a second UE 115), or both. In some cases, to ease such measurements of RF distances at the first UE 115, the second UE 115, or both, a resource pool may disable open-loop power control (OLPC) (e.g., since OLPC is not mandatory to a Mode 2 resource pool) such that RF distances may be obtained via measurements of overhead DMRS. It some cases, nominal TX power from L3 may be assumed. Additionally, disabling power control may correspond to a common practice for deployments in unlicensed band, especially when interference is detected (e.g., from other RATs).

In some cases, legacy sidelink procedures may support RF distance measurements between paired UEs 115 on DMRS with PC5-RRC configurations (e.g., specified for supporting OLPC). Therefore, the same framework may be utilized to obtain RF distances even when OLPC is enabled. Additionally or alternatively, to ease measurement of RF distances, a Mode 2 resource pool may introduce extended HARQ feedback that carries HARQ responses as well as respective UE IDs and respective beam indices. Such an extended HARQ feedback response may be transmitted over a physical sidelink feedback channel (PSFCH), as a stand-alone SCI, or both. With the above enhancements, RF distances may be obtained via measuring HARQ responses without asking a UE to transmit dummy data.

In some examples, a first UE 115 may obtain RF distances periodically, in an aperiodic fashion, based on one or more triggers, or some combination thereof. As such, some RF distances may be updated while others may age (e.g., become inaccurate with time in the case of mobile UEs). Therefore, when performing historical pathloss assisted sensing, the first UE 115 may be configured to utilize an RF distance that was last updated in a historical pathloss measurement window 435, which may be larger or smaller than the SW 405. The historical pathloss measurement window 435 may depend on the relative movement between two UEs 115 communicating via sidelink. For example, if two UEs 115 are traveling at a relatively high rate, the historical pathloss measurement window 435 may be relatively short so that RF distances are refreshed to account for the traveling. In some cases, such as stationary UEs 115, a relatively longer historical pathloss measurement window 435. Hence, different entries in historical pathloss measurements may have respective historical pathloss measurement windows 435.

In other cases, such as when an RF distance is absent or outdated (e.g., due to aging), the first UE 115 may be configured to operate according to one or more default options. For example, the first UE 115 may skip utilizing the historical pathloss measurements in combination with sensing in sidelink. In other words, the first UE 115 may fall back onto legacy sensing to determine availability of one or more sidelink resources. As another example, the first UE 115 may perform historical pathloss measurement assisted sensing with a default RF distance value. The RF distance value may be determined by one or more resource pools, which may be a function of geographic distance between the first UE 115 and the second UE 115 plus an adjustment term to reflect the one or more resource pool's spatial reuse policy.

Figure 5A:
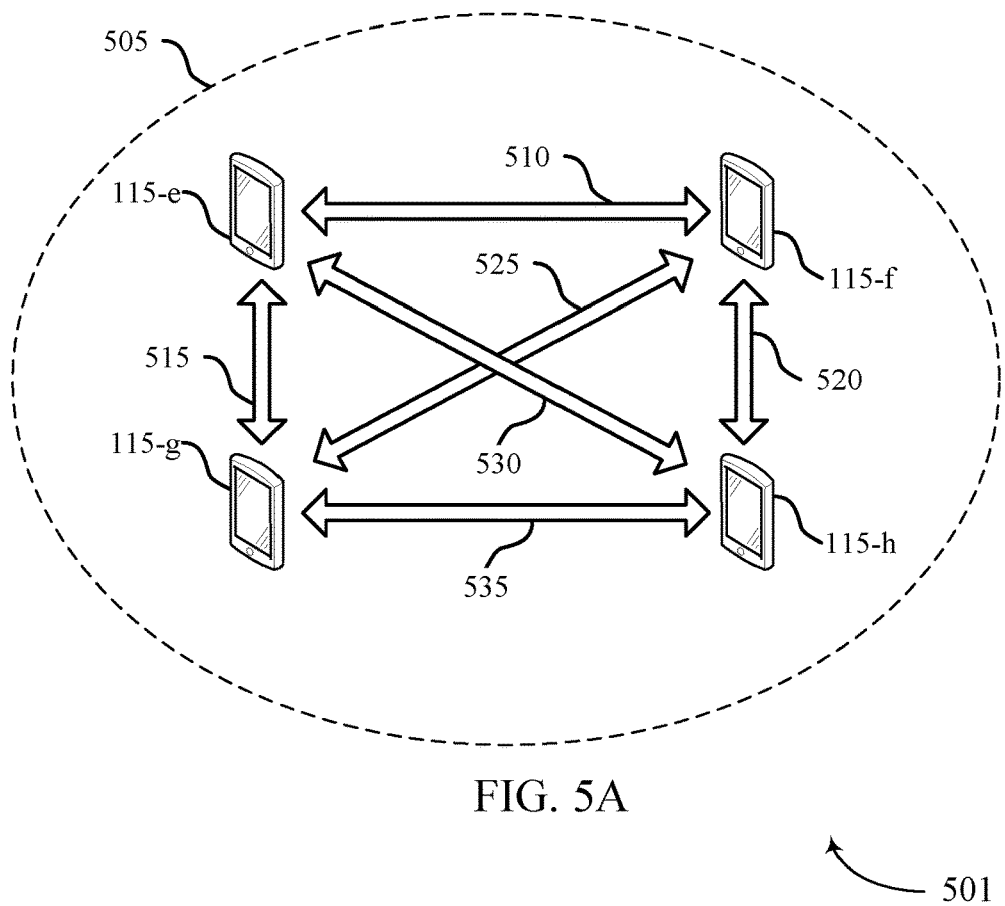
FIGS. 5A and 5B illustrate examples of a subset and resource diagram that support historical pathloss assisted sensing in sidelink in accordance with aspects of the present disclosure.

FIG. 5A illustrates an example of a subset 501 that supports historical pathloss assisted sensing in sidelink in accordance with aspects of the present disclosure. The subset 501 may be implemented by a UE 115-*e*, 115-*f*, 115-*g*, and 115-

In some cases, the UE 115-*e* (e.g., a first UE 115) may leverage thresholds for un-acceptance and per-link margin of one or more beam pairs (e.g., based on RF distances in the historical pathloss measurements). For example, the UE 115-e may be configured in L3 with different thresholds for TX-yielding and RX-yielding, respectively. For example, the UE 115-e may receive an interference threshold where, if interference is detected that satisfies the interference threshold, the UE 115-e may determine to implement TX-yielding. Likewise, the UE 115-e may receive a second interference threshold where, if interference is detected that satisfies the second interference threshold, the UE 115-e may determine to implement RX-yielding. In some cases, if an RF distance corresponding to a subchannel is smaller than a respective threshold, the subchannel may be determined as unavailable. In some examples, the respective thresholds may be a function of a priority associated with a considered PSSCH, PSCCH, or both, and that of the reservation SCI.

Additionally, a reservation SCI may also carry an additional margin or penalty with respect to the L3 thresholds for historical pathloss measurement assisted sensing. For example, if a second UE is transmitting to a third UE using conservative modulation and coding schemes (MCS), a corresponding SCI may indicate a margin to encourage spatial reuse. On the other hand, the SCI may carry a penalty to discourage or forbid any attempt at spatial reuse.

In some cases, instead of a resource pool-wide operation, the UE 115-e may reach agreements with a subset 505 of other UEs (e.g., the UEs 115-f, 115-g, and 115-h) to operate historical pathloss measurement assisted sensing within the subset. For example, each pair of the UEs 115-e, 115-f, 115-g, and 115-h may establish unicast connections and, hence, may leverage PC5-RRC to obtain RF distances. For example, the UE 115-e may establish a unicast connection 510 with UE 115-f, a unicast connection 515 with UE 115-g, and a unicast connection 530 with UE 115-h. Similarly, the UE 115-h may establish a unicast connection 535 with UE 115-g and a unicast connection 520 with UE 115-f. Lastly, the UE 115-f may establish a unicast connection 525 with UE 115-g. Based on the establish unicast connections, the UE 115-e may apply the historical pathloss measurement assisted sensing on SCIs sent by members (e.g., the UEs 115-f, 115-g, and 115-h) of the subset 505.

Figure 5B:
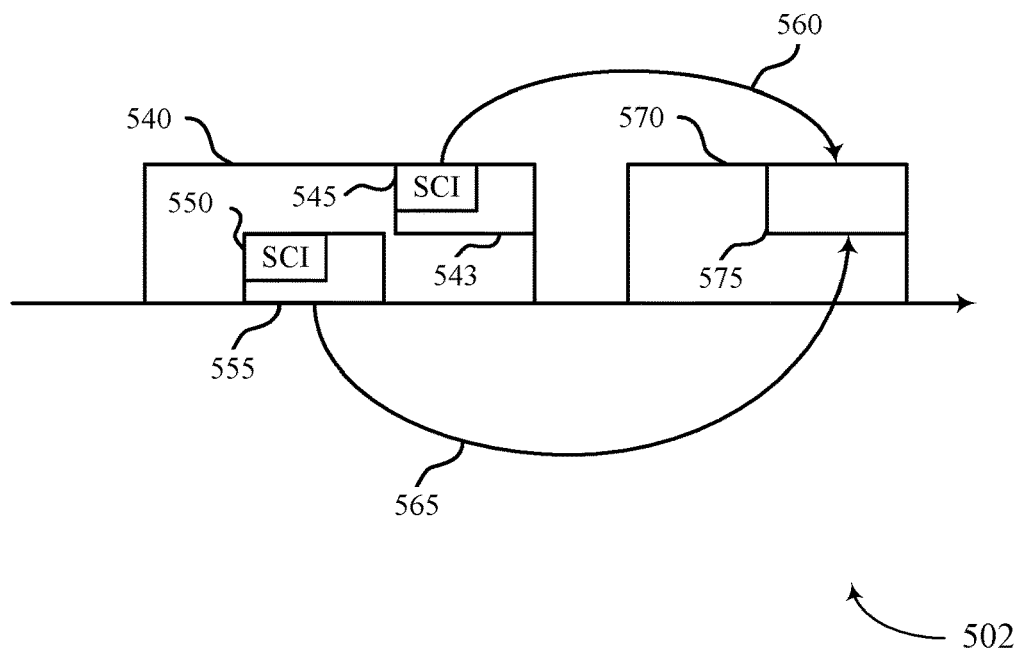

FIG. 5B illustrates a resource diagram 502 which may be associated with a TX UE performing sensing in Mode 2 within an SW 540. However, the UE 115-e may perform sensing to generate a UE coordination message. For example, the TX UE may choose an SCI 550 (e.g., within a resource 555) sent by a second UE to whom the TX UE wants to transmit the coordination message. For example, the UE 115-e may utilize, an SCI 545 in a resource 543 (e.g., from a third UE), the SCI 550 in the resource 555, or both, to generate a UE coordination message defining a considered PSCCH transmission, PSSCH transmission, or both. Based on the SCIs 545 and 550, the UE 115-e may then perform TX yielding, RX yielding, or both. Based on the SCIs 545 and 550, the UE 115-e may determine that both the second UE and the third UE may reserve, via a correspondence 565 and 560 respectively, a common resource 575 within an RSW 570.

Figure 6:
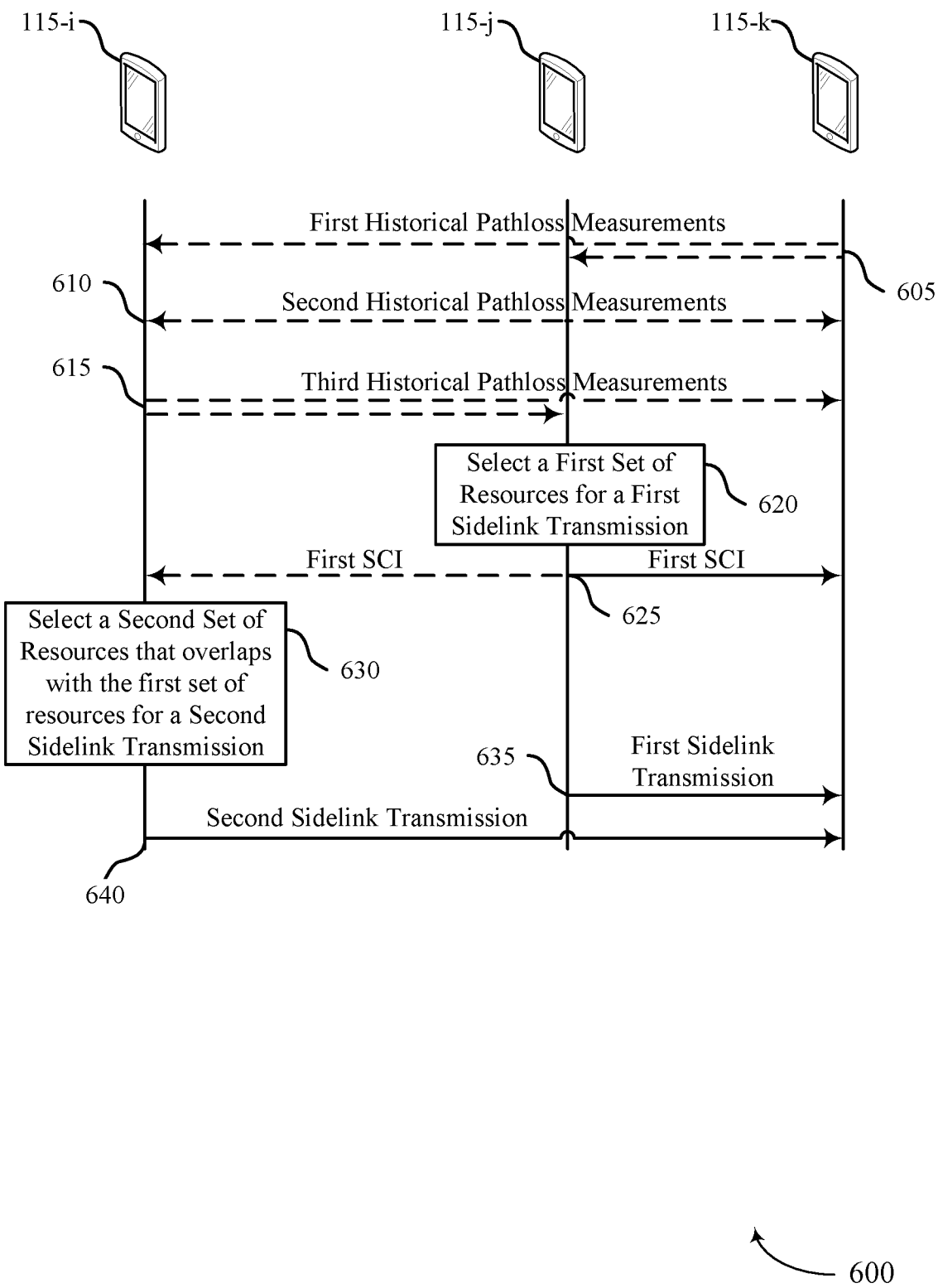
FIG. 6 illustrates an example of a process flow that supports historical pathloss assisted sensing in sidelink in accordance with aspects of the present disclosure.

FIG. 6 illustrates an example of a process flow 600 that supports historical pathloss assisted sensing in sidelink in accordance with aspects of the present disclosure. The process flow may be implemented by the UEs 115-i, 115-j, and 115-k, which may be examples of UEs 115 as described with reference to FIGS. 1-5B. It should be noted that, while specific steps are illustrated in the process flow 600, additional steps are may be added or removed, and may occur in different orders, to support historical pathloss assisted sensing in sidelink.

Optionally, at 605, the UE 115-k may transmit first historical pathloss measurements to the UE 115-j and the UE 115-i based on measurements obtained at the UE 115-k. Similarly, at 610, the UE 115-j may transmit second historical pathloss measurements to the UE 115-i and the UE 115-k based on measurements obtained at the UE 115-i. Lastly, at 615, the UE 115-i may transmit third historical pathloss measurements to the UE 115-j and the UE 115-k based on measurements obtained at the UE 115-i. In some examples, the UE 115-k, the UE 115-i, the UE 115-j, or some combination thereof, may refrain from exchanging one or more of the first, second, or third historical pathloss measurements. Instead, one or more of the UEs 115-k, 115-i, and 115-j may rely on in situ historical pathloss measurements.

At 620, the UE 115-j may select a first set of resources for a first sidelink transmission to the UE 115-k. For example, the UE 115-j may select the first set of resources based on contention-based access procedures to support the first sidelink transmission to the UE 115-k.

At 625, the UE 115-j may transmit, to the UE 115-k, a first SCI during a sensing window. The first SCI may correspond to a scheduling notification for a first sidelink transmission between the UE 115-k and the UE 115-j utilizing a first set of resources. In some examples, however, the UE 115-i may monitor (e.g., during a sensing window) and subsequently detect the first SC. In such cases, the UE 115-i may determine the first set of resources associated with the first SCI during the sensing window.

At 630, the UE 115-i may select a second set of resources that overlaps with the first set of resources for a second sidelink transmission (e.g., to the UE 115-k). In some examples, the second set of resources may be further determined based on the first historical pathloss measurements, the second historical pathloss measurements, the third historical pathloss measurements, legacy based sensing, or some combination thereof. Additionally or alternatively, the UE 115-i may determine the second set of resources based on the second set of resources producing less than a threshold amount of interference to the first set of sidelink resources.

At 635, the UE 115-j may transmit a first sidelink transmission to the UE 115-k utilizing the first set of sidelink resources. At 640, the UE 115-i may transmit a second sidelink transmission to the UE 115-k utilizing the overlapping set of resources based on the historical pathloss measurements, the first SCI, the third SCI, legacy sensing, the first, second, or third historical pathloss measurements, or some combination thereof. For example, the UE 115-i may use the third historical pathloss measurements to identify whether overlapping sidelink resources can be safely used to transmit the second sidelink transmission. As described above, the UE 115-i may, in some cases, determine to perform RX-yielding, TX-yielding, or both, based on the overlapping sidelink resources.

Figure 7:
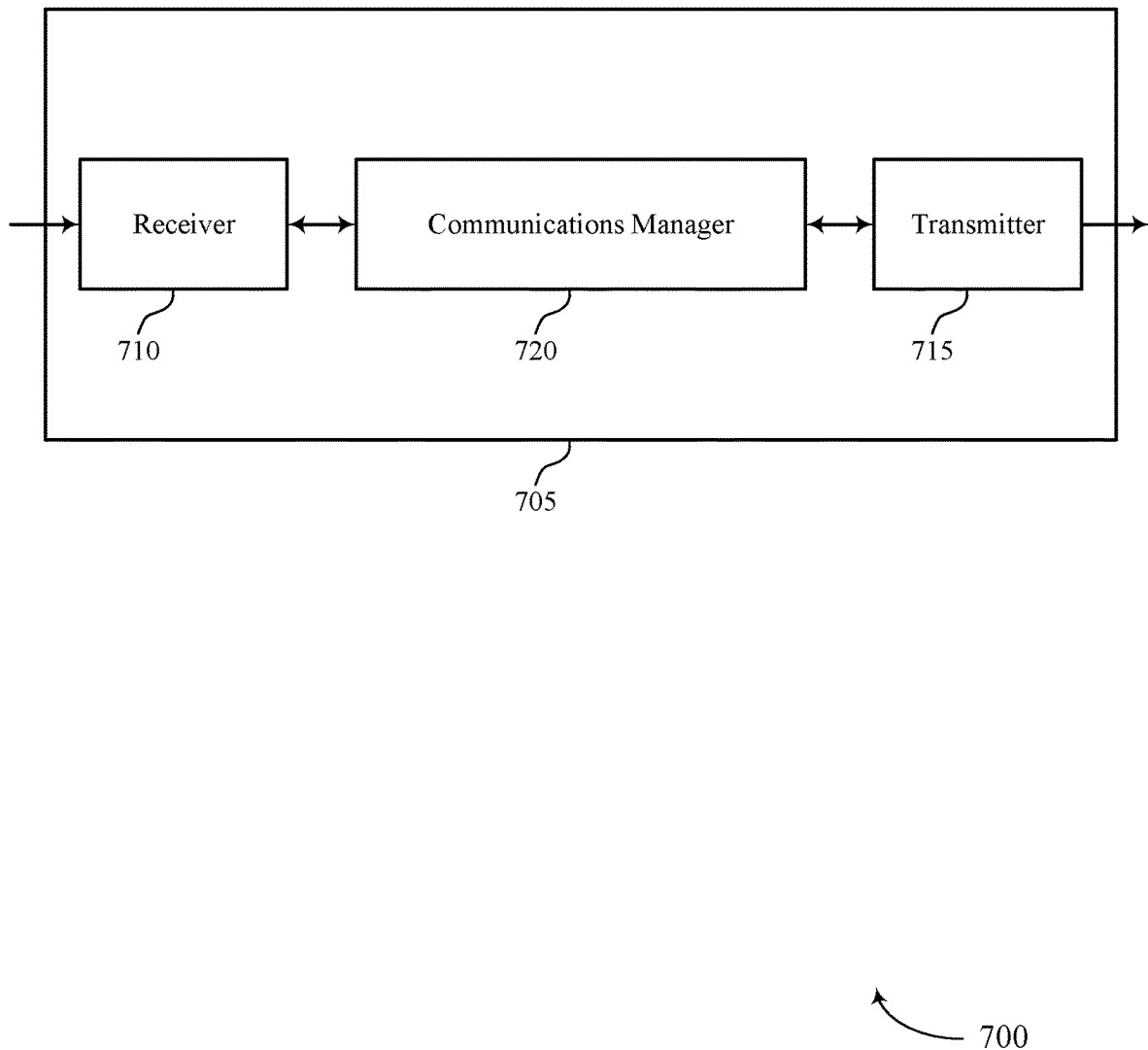
FIG. 7 and show block diagrams of devices that support historical pathloss assisted sensing in sidelink in accordance with aspects of the present disclosure.

FIG. 7 shows a block diagram 700 of a device 705 that supports historical pathloss assisted sensing in sidelink in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to historical pathloss assisted sensing in sidelink). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to historical pathloss assisted sensing in sidelink). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of historical pathloss assisted sensing in sidelink as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for receiving, during a sensing window, an indication of a first set of resources in a resource selection window that are associated with a first sidelink transmission by a second UE. The communications manager 720 may be configured as or otherwise support a means for selecting a second set of resources in the resource selection window for a second sidelink transmission, where a degree of overlap between the second set of resources and the first set of resources is based on one or more historical pathloss measurements between the first UE and the second UE. The communications manager 720 may be configured as or otherwise support a means for communicating with a third UE via the second sidelink transmission using the second set of resources.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for, more efficient utilization of communication resources and more efficient processing by utilizing historical pathloss measurements in support of sidelink communications.

Figure 8:
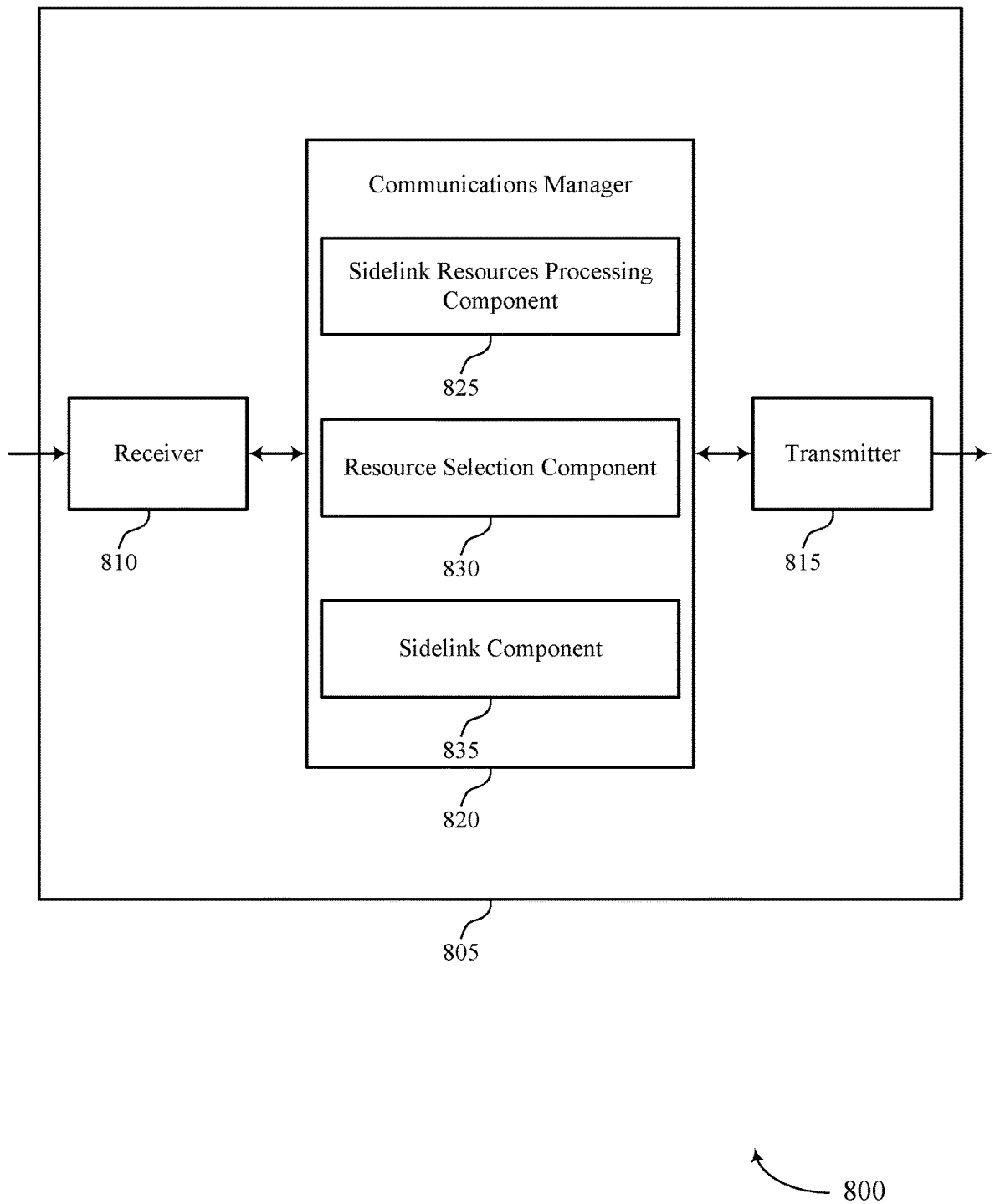
FIGS. 8 and 9 shows a block diagram of a communications manager that supports historical pathloss assisted sensing in sidelink in accordance with aspects of the present disclosure.

FIG. 8 shows a block diagram 00 of a device 05 that supports historical pathloss assisted sensing in sidelink in accordance with aspects of the present disclosure. The device 05 may be an example of aspects of a device 705 or a UE 115 as described herein. The device 05 may include a receiver 10, a transmitter 15, and a communications manager 20. The device 05 may also include a processor. Each of these components may be in communication with one another (e.g., via one or more buses).

The receiver 10 may provide a means for receiving information such as packets, user data, control information, or any combination thereof associated with various information channels (e.g., control channels, data channels, information channels related to historical pathloss assisted sensing in sidelink). Information may be passed on to other components of the device 05. The receiver 10 may utilize a single antenna or a set of multiple antennas.

The transmitter 15 may provide a means for transmitting signals generated by other components of the device 05. For example, the transmitter 15 may transmit information such as packets, user data, control information, or any combination thereof associated with various information channels (e.g., control channels, data channels, information channels related to historical pathloss assisted sensing in sidelink). In some examples, the transmitter 15 may be co-located with a receiver 10 in a transceiver module. The transmitter 15 may utilize a single antenna or a set of multiple antennas.

The device 05, or various components thereof, may be an example of means for performing various aspects of historical pathloss assisted sensing in sidelink as described herein. For example, the communications manager 20 may include a sidelink resources processing component 25, a resource selection component 30, a sidelink component 35, or any combination thereof. The communications manager 20 may be an example of aspects of a communications manager 720 as described herein. In some examples, the communications manager 20, or various components thereof, may be configured to perform various operations (e.g., receiving, monitoring, transmitting) using or otherwise in cooperation with the receiver 10, the transmitter 15, or both. For example, the communications manager 20 may receive information from the receiver 10, send information to the transmitter 15, or be integrated in combination with the receiver 10, the transmitter 15, or both to receive information, transmit information, or perform various other operations as described herein.

The communications manager 20 may support wireless communications at a first UE in accordance with examples as disclosed herein. The sidelink resources processing component 25 may be configured as or otherwise support a means for receiving, during a sensing window, an indication of a first set of resources in a resource selection window that are associated with a first sidelink transmission by a second UE. The resource selection component 30 may be configured as or otherwise support a means for selecting a second set of resources in the resource selection window for a second sidelink transmission, where a degree of overlap between the second set of resources and the first set of resources is based on one or more historical pathloss measurements between the first UE and the second UE. The sidelink component 35 may be configured as or otherwise support a means for communicating with a third UE via the second sidelink transmission using the second set of resources.

Figure 9:
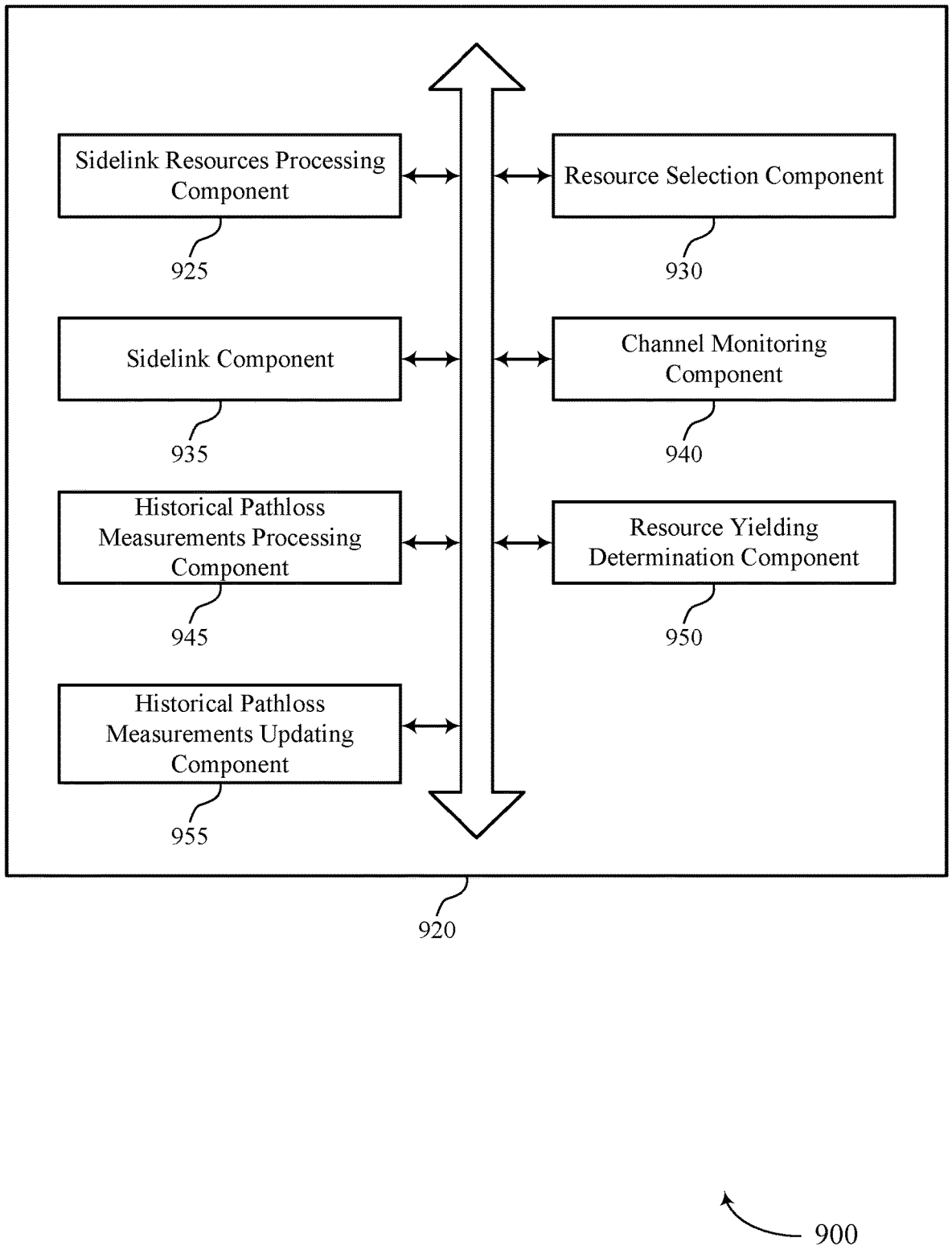

FIG. 9 shows a block diagram 00 of a communications manager 20 that supports historical pathloss assisted sensing in sidelink in accordance with aspects of the present disclosure. The communications manager 20 may be an example of aspects of a communications manager 720, a communications manager 20, or both, as described herein. The communications manager 20, or various components thereof, may be an example of means for performing various aspects of historical pathloss assisted sensing in sidelink as described herein. For example, the communications manager 20 may include a sidelink resources processing component 25, a resource selection component 30, a sidelink component 35, a channel monitoring component 40, a historical pathloss measurements processing component 45, a resource yielding determination component 50, a historical pathloss measurements updating component 55, or any combination thereof. Each of these components may communicate, directly or indirectly, with one another (e.g., via one or more buses).

The communications manager 20 may support wireless communications at a first UE in accordance with examples as disclosed herein. The sidelink resources processing component 25 may be configured as or otherwise support a means for receiving, during a sensing window, an indication of a first set of resources in a resource selection window that are associated with a first sidelink transmission by a second UE. The resource selection component 30 may be configured as or otherwise support a means for selecting a second set of resources in the resource selection window for a second sidelink transmission, where a degree of overlap between the second set of resources and the first set of resources is based on one or more historical pathloss measurements between the first UE and the second UE. The sidelink component 35 may be configured as or otherwise support a means for communicating with a third UE via the second sidelink transmission using the second set of resources.

In some examples, the channel monitoring component 40 may be configured as or otherwise support a means for monitoring a wireless communications channel to obtain at least a portion of the historical pathloss measurements, where the monitoring is based on the indication of the first set of resources.

In some examples, the historical pathloss measurements processing component 45 may be configured as or otherwise support a means for receiving an indication of at least a portion of the historical pathloss measurements from the second UE.

In some examples, the indication of at least a portion of the historical pathloss measurements from the second UE corresponds to a unicast message, a PC5-radio resource control message, a medium access control-control message, or some combination thereof.

In some examples, at least a portion of the historical pathloss measurements occur outside of the sensing window.

In some examples, to support communicating with the third UE, the resource yielding determination component 50 may be configured as or otherwise support a means for yielding, at the first UE, sidelink resources based on the one or more historical pathloss measurements, the indication of the first set of resources, the second set of resources, and a threshold, the threshold associated with the one or more historical pathloss measurements.

In some examples, the resource selection component 30 may be configured as or otherwise support a means for selecting the second set of resources in the resource selection window for the second sidelink transmission to be non-overlapping with the first set of resources when one or more pathloss measurements between the first UE and the second UE in the historical pathloss measurements satisfy the threshold.

In some examples, the resource selection component 30 may be configured as or otherwise support a means for selecting the second set of resources in the resource selection window for the second sidelink transmission to be partially overlapping with the first set of resources when one or more pathloss measurements between the first UE and the second UE in the historical pathloss measurements being less than the threshold.

In some examples, the one or more historical pathloss measurements include beam specific measurements, the beam specific measurements based on beam pairs associated with the first set of resources. In some examples, selecting the second set of resources in the resource selection window for the second sidelink transmission is based on the beam specific measurements.

In some examples, the indication of the first set of resources includes sidelink control information.

In some examples, the sidelink control information includes transmission beam indices associated with sidelink transmissions corresponding to the first UE, the second UE, or both, the historical pathloss measurements based on the transmission beam indices.

In some examples, the sidelink control information further includes one or more reservation fields, the reservation fields corresponding to a set of transmission beam indices and reception beam indices, the historical pathloss measurements based on the set of transmission beam indices and reception beam indices.

In some examples, the historical pathloss measurements updating component 55 may be configured as or otherwise support a means for updating the one or more historical pathloss measurements according to a periodic schedule, one or more update triggers, an aperiodic schedule, or some combination thereof.

In some examples, the selection of the second set of resources is based on a contention-based access procedure, the one or more historical pathloss measurements, or both.

In some examples, the first UE selects or discards a subset of measurements of the one or more historic pathloss measurements to use in selecting the second set of resources, the subset of measurements based on temporal proximities associated with the one or more historic pathloss measurements, a set of default historical pathloss measurements, or both.

Figure 10:
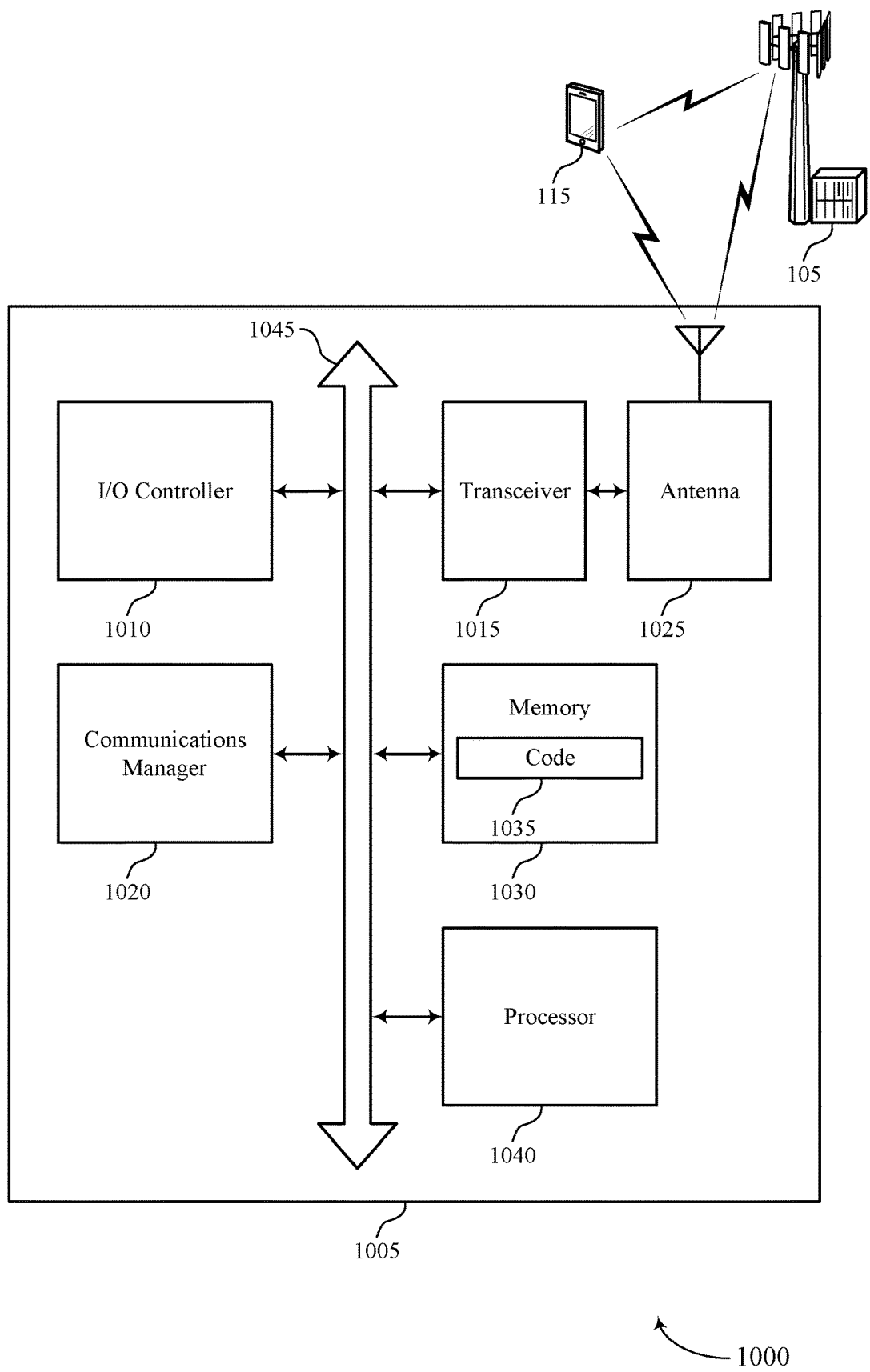
FIG. 10 shows a diagram of a system including a device that supports historical pathloss assisted sensing in sidelink in accordance with aspects of the present disclosure.

FIG. 10 shows a diagram of a system 1000 including a device 1005 that supports historical pathloss assisted sensing in sidelink in accordance with aspects of the present disclosure. The device 1005 may be an example of or include the components of a device 705, a device 05, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 15, a receiver 710, a receiver 10, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting historical pathloss assisted sensing in sidelink). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for receiving, during a sensing window, an indication of a first set of resources in a resource selection window that are associated with a first sidelink transmission by a second UE. The communications manager 1020 may be configured as or otherwise support a means for selecting a second set of resources in the resource selection window for a second sidelink transmission, where a degree of overlap between the second set of resources and the first set of resources is based on one or more historical pathloss measurements between the first UE and the second UE. The communications manager 1020 may be configured as or otherwise support a means for communicating with a third UE via the second sidelink transmission using the second set of resources.

By including or configuring the communications manager 1020 in accordance with examples as described herein, the device 1005 may support techniques for improved communication reliability, reduced latency, improved user experience related to reduced processing, reduced power consumption, more efficient utilization of communication resources, and improved coordination between devices by utilizing historical pathloss measurement assisted sidelink communications.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of historical pathloss assisted sensing in sidelink as described herein, or the processor 1040 and the memory 1030 may be otherwise configured to perform or support such operations.

Figure 11:
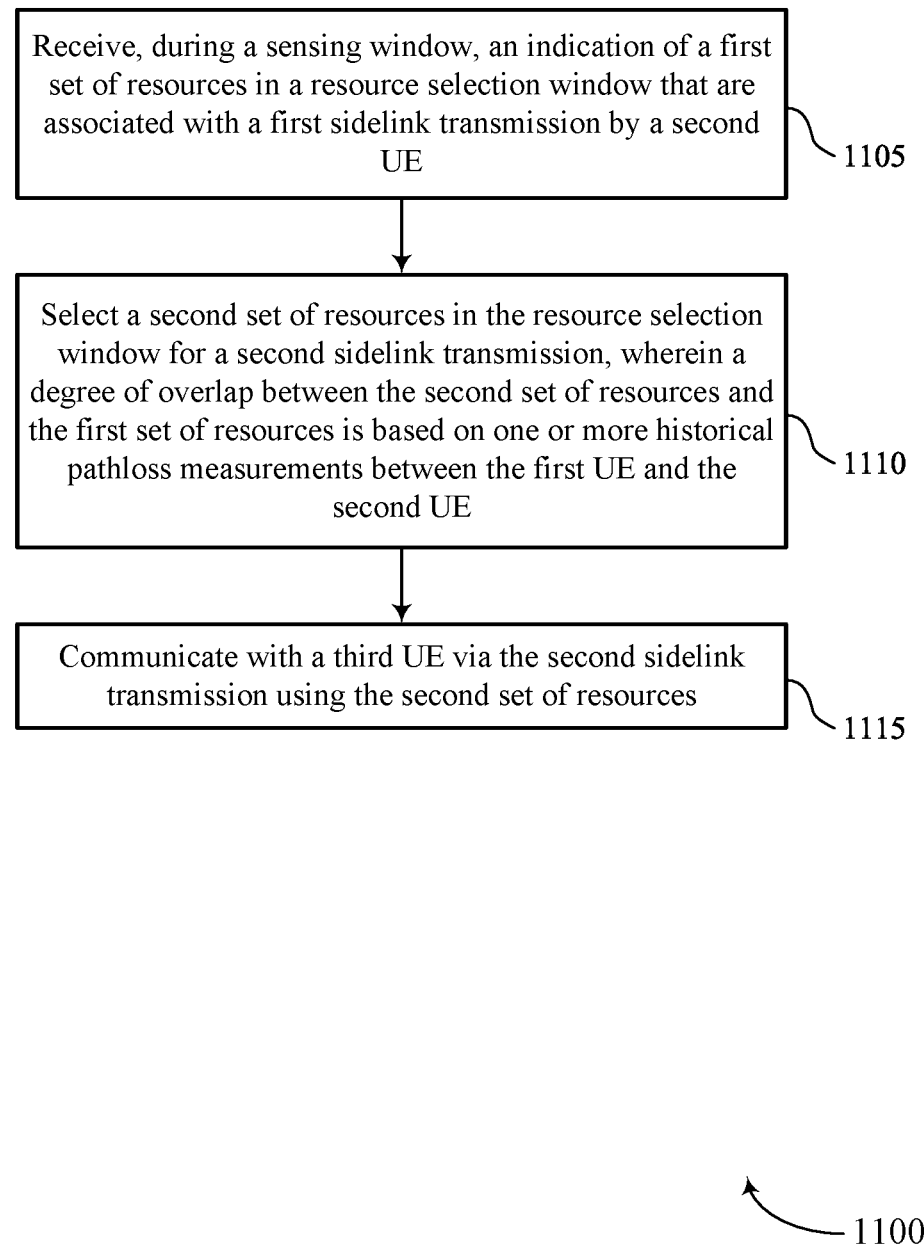
FIGS. 11 and 12 show flowcharts illustrating methods that support historical pathloss assisted sensing in sidelink in accordance with aspects of the present disclosure.

FIG. 11 shows a flowchart illustrating a method 1100 that supports historical pathloss assisted sensing in sidelink in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving, during a sensing window, an indication of a first set of resources in a resource selection window that are associated with a first sidelink transmission by a second UE. The operations of 1105 may be performed in accordance with examples as disclosed herein. In some examples, aspects of the operations of 1105 may be performed by an sidelink resources processing component 25 as described with reference to FIG.

At 1110, the method may include selecting a second set of resources in the resource selection window for a second sidelink transmission, where a degree of overlap between the second set of resources and the first set of resources is based on one or more historical pathloss measurements between the first UE and the second UE. The operations of 1110 may be performed in accordance with examples as disclosed herein. In some examples, aspects of the operations of 1110 may be performed by a resource selection component 30 as described with reference to FIG.

At 1115, the method may include communicating with a third UE via the second sidelink transmission using the second set of resources. The operations of 1115 may be performed in accordance with examples as disclosed herein. In some examples, aspects of the operations of 1115 may be performed by a communication component 35 as described with reference to FIG.

Figure 12:
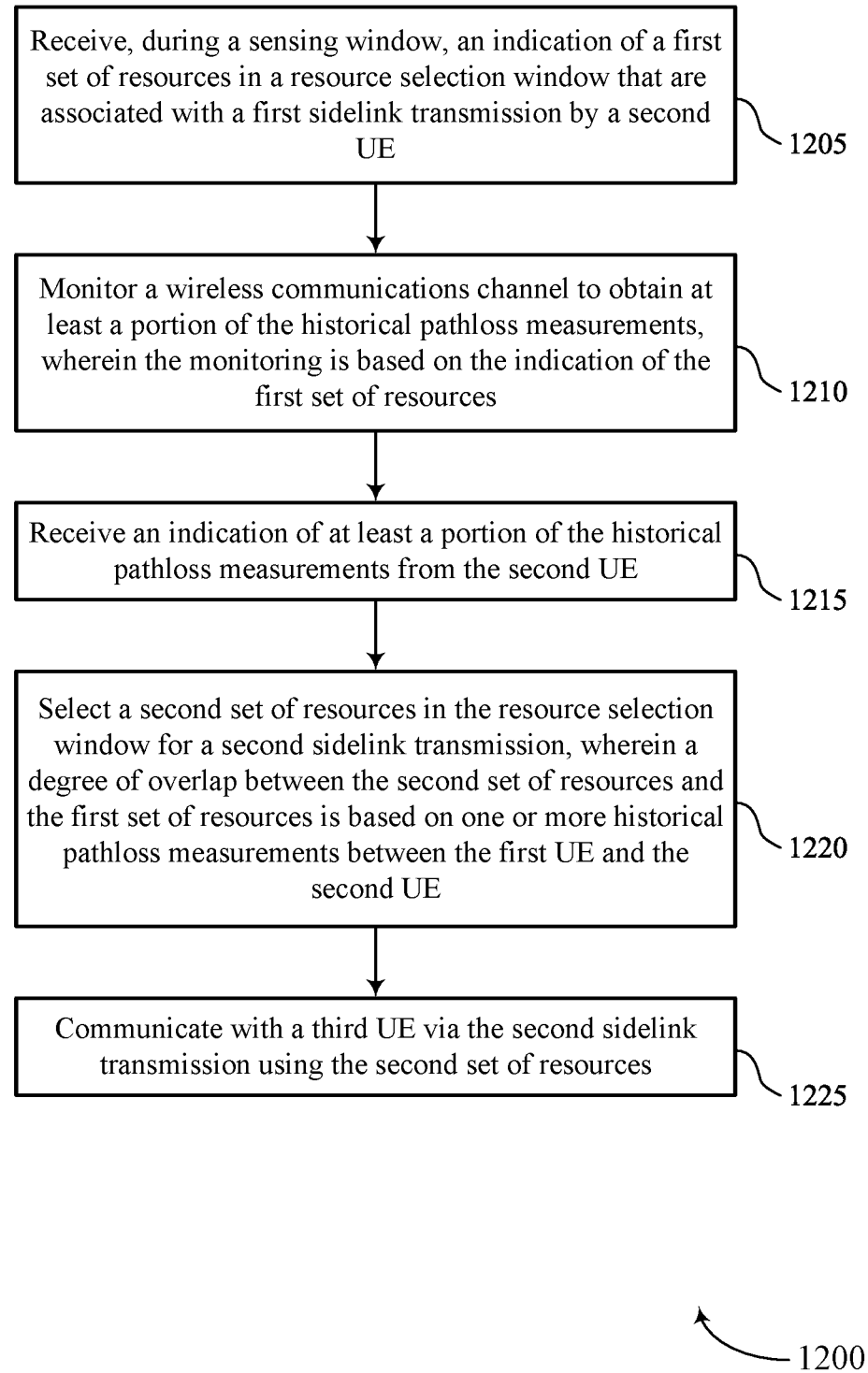

FIG. 12 shows a flowchart illustrating a method 1200 that supports historical pathloss assisted sensing in sidelink in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving, during a sensing window, an indication of a first set of resources in a resource selection window that are associated with a first sidelink transmission by a second UE. The operations of 1205 may be performed in accordance with examples as disclosed herein. In some examples, aspects of the operations of 1205 may be performed by an sidelink resources processing component 25 as described with reference to FIG.

At 1210, the method may include monitoring a wireless communications channel to obtain at least a portion of the historical pathloss measurements, where the monitoring is based on the indication of the first set of resources. The operations of 1210 may be performed in accordance with examples as disclosed herein. In some examples, aspects of the operations of 1210 may be performed by a channel monitoring component 40 as described with reference to FIG.

At 1215, the method may include receiving an indication of at least a portion of the historical pathloss measurements from the second UE. The operations of 1215 may be performed in accordance with examples as disclosed herein.

In some examples, aspects of the operations of 1215 may be performed by an sidelink resources processing component 25 as described with reference to FIG.

At 1220, the method may include selecting a second set of resources in the resource selection window for a second sidelink transmission, where a degree of overlap between the second set of resources and the first set of resources is based on one or more historical pathloss measurements between the first UE and the second UE. The operations of 1220 may be performed in accordance with examples as disclosed herein. In some examples, aspects of the operations of 1220 may be performed by a resource selection component 30 as described with reference to FIG.

At 1225, the method may include communicating with a third UE via the second sidelink transmission using the second set of resources. The operations of 1225 may be performed in accordance with examples as disclosed herein. In some examples, aspects of the operations of 1225 may be performed by a communication component 35 as described with reference to FIG.

The following provides an overview of aspects of the present disclosure:

Aspect 1: A method for wireless communications at a first UE, comprising: receiving, during a sensing window, an indication of a first set of resources in a resource selection window that are associated with a first sidelink transmission by a second UE; selecting a second set of resources in the resource selection window for a second sidelink transmission, wherein a degree of overlap between the second set of resources and the first set of resources is based at least in part on one or more historical pathloss measurements between the first UE and the second UE; and communicating with a third UE via the second sidelink transmission using the second set of resources.

Aspect 2: The method of aspect 1, further comprising: monitoring a wireless communications channel to obtain at least a portion of the historical pathloss measurements, wherein the monitoring is based at least in part on the indication of the first set of resources.

Aspect 3: The method of any of aspects 1 through 2, further comprising: receiving an indication of at least a portion of the historical pathloss measurements from the second UE.

Aspect 4: The method of aspect 3, wherein the indication of at least a portion of the historical pathloss measurements from the second UE corresponds to a unicast message, a PC5-radio resource control message, a medium access control-control message, or some combination thereof.

Aspect 5: The method of any of aspects 1 through 4, wherein at least a portion of the historical pathloss measurements occur outside of the sensing window.

Aspect 6: The method of any of aspects 1 through 5, wherein communicating with the third UE further comprises: yielding, at the first UE, sidelink resources based at least in part on the one or more historical pathloss measurements, the indication of the first set of resources, the second set of resources, and a threshold, the threshold associated with the one or more historical pathloss measurements.

Aspect 7: The method of aspect 6, further comprising: selecting the second set of resources in the resource selection window for the second sidelink transmission to be non-overlapping with the first set of resources when one or more pathloss measurements between the first UE and the second UE in the historical pathloss measurements satisfy the threshold.

Aspect 8: The method of any of aspects 6 through 7, further comprising: selecting the second set of resources in the resource selection window for the second sidelink transmission to be partially overlapping with the first set of resources when one or more pathloss measurements between the first UE and the second UE in the historical pathloss measurements being less than the threshold.

Aspect 9: The method of any of aspects 1 through 8, wherein the one or more historical pathloss measurements comprise beam specific measurements, the beam specific measurements based at least in part on beam pairs associated with the first set of resources, selecting the second set of resources in the resource selection window for the second sidelink transmission is based at least in part on the beam specific measurements.

Aspect 10: The method of any of aspects 1 through 9, wherein the indication of the first set of resources comprises sidelink control information.

Aspect 11: The method of aspect 10, wherein the sidelink control information comprises transmission beam indices associated with sidelink transmissions corresponding to the first UE, the second UE, or both, the historical pathloss measurements based at least in part on the transmission beam indices.

Aspect 12: The method of aspect 11, wherein the sidelink control information further comprises one or more reservation fields, the reservation fields corresponding to a set of transmission beam indices and reception beam indices, the historical pathloss measurements based at least in part on the set of transmission beam indices and reception beam indices.

Aspect 13: The method of any of aspects 1 through 12, further comprising: updating the one or more historical pathloss measurements according to a periodic schedule, one or more update triggers, an aperiodic schedule, or some combination thereof.

Aspect 14: The method of any of aspects 1 through 13, wherein the selection of the second set of resources is based at least in part on a contention-based access procedure, the one or more historical pathloss measurements, or both.

Aspect 15: The method of any of aspects 1 through 14, wherein the first UE selects or discards a subset of measurements of the one or more historic pathloss measurements to use in selecting the second set of resources, the subset of measurements based at least in part on temporal proximities associated with the one or more historic pathloss measurements, a set of default historical pathloss measurements, or both.

Aspect 16: An apparatus for wireless communications at a first UE, comprising a processor; memory coupled with the processor; and instructions stored in the memory and executable by the processor to cause the apparatus to perform a method of any of aspects 1 through 15.

Aspect 17: An apparatus for wireless communications at a first UE, comprising at least one means for performing a method of any of aspects 1 through 15.

Aspect 18: A non-transitory computer-readable medium storing code for wireless communications at a first UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions. Also, as used herein, the phrase "a set" shall be construed as including the possibility of a set with one member. That is, the phrase "a set" shall be construed in the same manner as "one or more." to support this interpretation.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE), comprising:
   one or more processors;
   one or more memories coupled with the one or more processors; and
   instructions stored in the one or more memories and executable by the one or more processors to cause the first UE to:
   receive, during a sensing window, an indication of a first set of resources in a resource selection window that are associated with a first sidelink transmission by a second UE;
   select a second set of resources in the resource selection window for a second sidelink transmission, wherein a degree of overlap between the second set of resources and the first set of resources is based at least in part on one or more historical pathloss measurements between the first UE and the second UE, wherein at least a portion of the one or more historical pathloss measurements is collected by the UE during a duration outside of the sensing window; and
   communicate with a third UE via the second sidelink transmission using the second set of resources.

2. The first UE of claim 1, wherein the instructions are further executable by the one or more processors to cause the first UE to:
   monitor a wireless communications channel to obtain at least the portion of the one or more historical pathloss measurements, wherein the monitoring is based at least in part on the indication of the first set of resources.

3. The first UE of claim 1, wherein the instructions are further executable by the one or more processors to cause the first UE to:
   receive an indication of at least the portion of the one or more historical pathloss measurements from the second UE.

4. The first UE of claim 3, wherein the indication of at least the portion of the one or more historical pathloss measurements from the second UE corresponds to at least one of a unicast message, a PC5-radio resource control message, or a medium access control-control message.

5. The first UE of claim 1, wherein the instructions to communicate with the third UE are further executable by the one or more processors to cause the first UE to:
   yield, at the first UE, sidelink resources based at least in part on the one or more historical pathloss measurements, the indication of the first set of resources, the second set of resources, and a threshold, the threshold associated with the one or more historical pathloss measurements.

6. The first UE of claim 5, wherein the instructions are further executable by the one or more processors to cause the first UE to:
   select the second set of resources in the resource selection window for the second sidelink transmission to be non-overlapping with the first set of resources when one or more pathloss measurements between the first UE and the second UE in the one or more historical pathloss measurements satisfy the threshold.

7. The first UE of claim 5, wherein the instructions are further executable by the one or more processors to cause the first UE to:
   select the second set of resources in the resource selection window for the second sidelink transmission to be partially overlapping with the first set of resources when one or more pathloss measurements between the first UE and the second UE in the one or more historical pathloss measurements being less than the threshold.

8. The first UE of claim 1, wherein:
the one or more historical pathloss measurements comprise beam specific measurements, the beam specific measurements based at least in part on beam pairs associated with the first set of resources, and
selecting the second set of resources in the resource selection window for the second sidelink transmission is based at least in part on the beam specific measurements.

9. The first UE of claim 1, wherein the indication of the first set of resources comprises sidelink control information.

10. The first UE of claim 9, wherein the sidelink control information comprises transmission beam indices associated with sidelink transmissions corresponding to the first UE, the second UE, or both, the one or more historical pathloss measurements based at least in part on the transmission beam indices.

11. The first UE of claim 10, wherein the sidelink control information further comprises one or more reservation fields, the one or more reservation fields corresponding to a set of transmission beam indices and reception beam indices, the one or more historical pathloss measurements based at least in part on the set of transmission beam indices and reception beam indices.

12. The first UE of claim 1, wherein the instructions are further executable by the one or more processors to cause the first UE to:
update the one or more historical pathloss measurements according to at least one of a periodic schedule, one or more update triggers, or an aperiodic schedule.

13. The first UE of claim 1, wherein the selection of the second set of resources is based at least in part on a contention-based access procedure, the one or more historical pathloss measurements, or both.

14. The first UE of claim 1, wherein the first UE selects or discards a subset of measurements of the one or more historical pathloss measurements to use in selecting the second set of resources, the subset of measurements based at least in part on temporal proximities associated with the one or more historical pathloss measurements, a set of default historical pathloss measurements, or both.

15. A method for wireless communications at a first user equipment (UE), comprising:
receiving, during a sensing window, an indication of a first set of resources in a resource selection window that are associated with a first sidelink transmission by a second UE;
selecting a second set of resources in the resource selection window for a second sidelink transmission, wherein a degree of overlap between the second set of resources and the first set of resources is based at least in part on one or more historical pathloss measurements between the first UE and the second UE, wherein at least a portion of the one or more historical pathloss measurements is collected by the UE during a duration outside of the sensing window; and
communicating with a third UE via the second sidelink transmission using the second set of resources.

16. The method of claim 15, further comprising:
monitoring a wireless communications channel to obtain at least the portion of the one or more historical pathloss measurements, wherein the monitoring is based at least in part on the indication of the first set of resources.

17. The method of claim 15, further comprising:
receiving an indication of at least the portion of the one or more historical pathloss measurements from the second UE.

18. The method of claim 17, wherein the indication of at least a portion of the one or more historical pathloss measurements from the second UE corresponds to at least one of a unicast message, a PC5-radio resource control message, or a medium access control-control message.

19. The method of claim 15, wherein communicating with the third UE further comprises:
yielding, at the first UE, sidelink resources based at least in part on the one or more historical pathloss measurements, the indication of the first set of resources, the second set of resources, and a threshold, the threshold associated with the one or more historical pathloss measurements.

20. The method of claim 19, further comprising:
selecting the second set of resources in the resource selection window for the second sidelink transmission to be non-overlapping with the first set of resources when one or more pathloss measurements between the first UE and the second UE in the one or more historical pathloss measurements satisfy the threshold.

21. The method of claim 19, further comprising:
selecting the second set of resources in the resource selection window for the second sidelink transmission to be partially overlapping with the first set of resources when one or more pathloss measurements between the first UE and the second UE in the one or more historical pathloss measurements being less than the threshold.

22. The method of claim 15, wherein:
the one or more historical pathloss measurements comprise beam specific measurements, the beam specific measurements based at least in part on beam pairs associated with the first set of resources, and
selecting the second set of resources in the resource selection window for the second sidelink transmission is based at least in part on the beam specific measurements.

23. The method of claim 15, wherein the indication of the first set of resources comprises sidelink control information.

24. The method of claim 23, wherein the sidelink control information comprises transmission beam indices associated with sidelink transmissions corresponding to the first UE, the second UE, or both, the one or more historical pathloss measurements based at least in part on the transmission beam indices.

25. The method of claim 24, wherein the sidelink control information further comprises one or more reservation fields, the one or more reservation fields corresponding to a set of transmission beam indices and reception beam indices, the one or more historical pathloss measurements based at least in part on the set of transmission beam indices and reception beam indices.

26. The method of claim 15, further comprising:
updating the one or more historical pathloss measurements according to at least one of a periodic schedule, one or more update triggers, or an aperiodic schedule.

27. A first user equipment (UE), comprising:
means for receiving, during a sensing window, an indication of a first set of resources in a resource selection window that are associated with a first sidelink transmission by a second UE;
means for selecting a second set of resources in the resource selection window for a second sidelink transmission, wherein a degree of overlap between the second set of resources and the first set of resources is based at least in part on one or more historical pathloss measurements between the first UE and the second UE, wherein at least a portion of the one or more historical pathloss measurements is collected by the UE during a duration outside of the sensing window; and means for communicating with a third UE via the second sidelink transmission using the second set of resources.

28. A non-transitory computer-readable medium storing code for wireless communications at a first user equipment (UE), the code comprising instructions executable by one or more processors to:

receive, during a sensing window, an indication of a first set of resources in a resource selection window that are associated with a first sidelink transmission by a second UE;

select a second set of resources in the resource selection window for a second sidelink transmission, wherein a degree of overlap between the second set of resources and the first set of resources is based at least in part on one or more historical pathloss measurements between the first UE and the second UE, wherein at least a portion of the one or more historical pathloss measurements is collected by the UE during a duration outside of the sensing window; and communicate with a third UE via the second sidelink transmission using the second set of resources.

* * * * *